(12) United States Patent
Kishigami et al.

(10) Patent No.: US 8,009,578 B2
(45) Date of Patent: Aug. 30, 2011

(54) WIRELESS BASE STATION DEVICE, TERMINAL, AND WIRELESS COMMUNICATION METHOD

(75) Inventors: Takaaki Kishigami, Tokyo (JP); Hidekuni Yomo, Tokyo (JP)

(73) Assignee: Panasonic Corporation, Osaka (JP)

( * ) Notice: Subject to any disclaimer, the term of this patent is extended or adjusted under 35 U.S.C. 154(b) by 847 days.

(21) Appl. No.: 11/911,165

(22) PCT Filed: Apr. 11, 2006

(86) PCT No.: PCT/JP2006/307613
§ 371 (c)(1),
(2), (4) Date: Oct. 10, 2007

(87) PCT Pub. No.: WO2006/109786
PCT Pub. Date: Oct. 19, 2006

(65) Prior Publication Data
US 2009/0279486 A1 Nov. 12, 2009

(30) Foreign Application Priority Data

Apr. 11, 2005 (JP) ................................. 2005-113238
Apr. 11, 2006 (JP) ................................. 2006-108157

(51) Int. Cl.
*H04J 1/16* (2006.01)
*H04J 3/04* (2006.01)

(52) U.S. Cl. .......................... 370/252; 370/535; 375/229
(58) Field of Classification Search .......................... None
See application file for complete search history.

(56) References Cited

U.S. PATENT DOCUMENTS

| | | | |
|---|---|---|---|
| 7,071,874 B2 | 7/2006 | Doi | |
| 2002/0027957 A1* | 3/2002 | Paulraj et al. | 375/267 |
| 2004/0166900 A1 | 8/2004 | Qiu et al. | |
| 2004/0190484 A1* | 9/2004 | Shin et al. | 370/347 |
| 2005/0063378 A1* | 3/2005 | Kadous | 370/389 |
| 2005/0201334 A1* | 9/2005 | Roh et al. | 370/334 |
| 2006/0072511 A1* | 4/2006 | Kent et al. | 370/334 |
| 2008/0285670 A1* | 11/2008 | Walton et al. | 375/260 |
| 2009/0010221 A1* | 1/2009 | Ginzburg et al. | 370/330 |
| 2009/0016263 A1* | 1/2009 | Kishigami et al. | 370/328 |
| 2009/0257521 A1* | 10/2009 | Kent et al. | 375/260 |
| 2011/0007832 A1 | 1/2011 | Yamada et al. | |

FOREIGN PATENT DOCUMENTS

JP 2003-051775 A 2/2003
(Continued)

OTHER PUBLICATIONS

T. Ohgane et al., "A Study on a Channel Allocation Scheme with an Adaptive Array in SDMA", 1997, pp. 725-729, vol. 2, Sapporo, Japan.

(Continued)

*Primary Examiner* — Andrew Lee
(74) *Attorney, Agent, or Firm* — RatnerPrestia

(57) ABSTRACT

A wireless base station device includes a plurality of transmit weight generation sections and a beam selection section. The transmit weight generation sections generate pieces of transmit weight information used for spatial division multiplexing transmission according to different algorithms. The pieces of transmit weight information are generated based on channel information on a plurality of terminals each having one or more antennas with which the wireless base station device performs spatial division multiplexing transmission. The beam selection section selects one of the pieces of transmit weight information generated.

9 Claims, 15 Drawing Sheets

FOREIGN PATENT DOCUMENTS

| | | |
|---|---|---|
| JP | 2003-51775 A | 2/2003 |
| JP | 2003-78479 A | 3/2003 |
| JP | 2003-283466 A | 10/2003 |
| JP | 2003-284128 A | 10/2003 |
| JP | 2003-32167 A | 1/2004 |
| JP | 2004-153527 A | 5/2004 |
| JP | 2004-260467 A | 9/2004 |
| JP | 2005-033335 A | 2/2005 |
| JP | 2006-108157 | 4/2011 |

OTHER PUBLICATIONS

A. Jalali et al., "Data Throughput of CDMA-HDR a High Efficiency-High Data Rate Personal Communication Wireless System", 2000, pp. 1854-1858, Qualcomm, Inc. San Diego, USA.

International Search Report for Publication No. PCT/JP2006/307613 dated Jul. 18, 2006.

Chinese Office Action for Application No. 200680011777.1, Sep. 2, 2010, Panasonic Corporation.

* cited by examiner

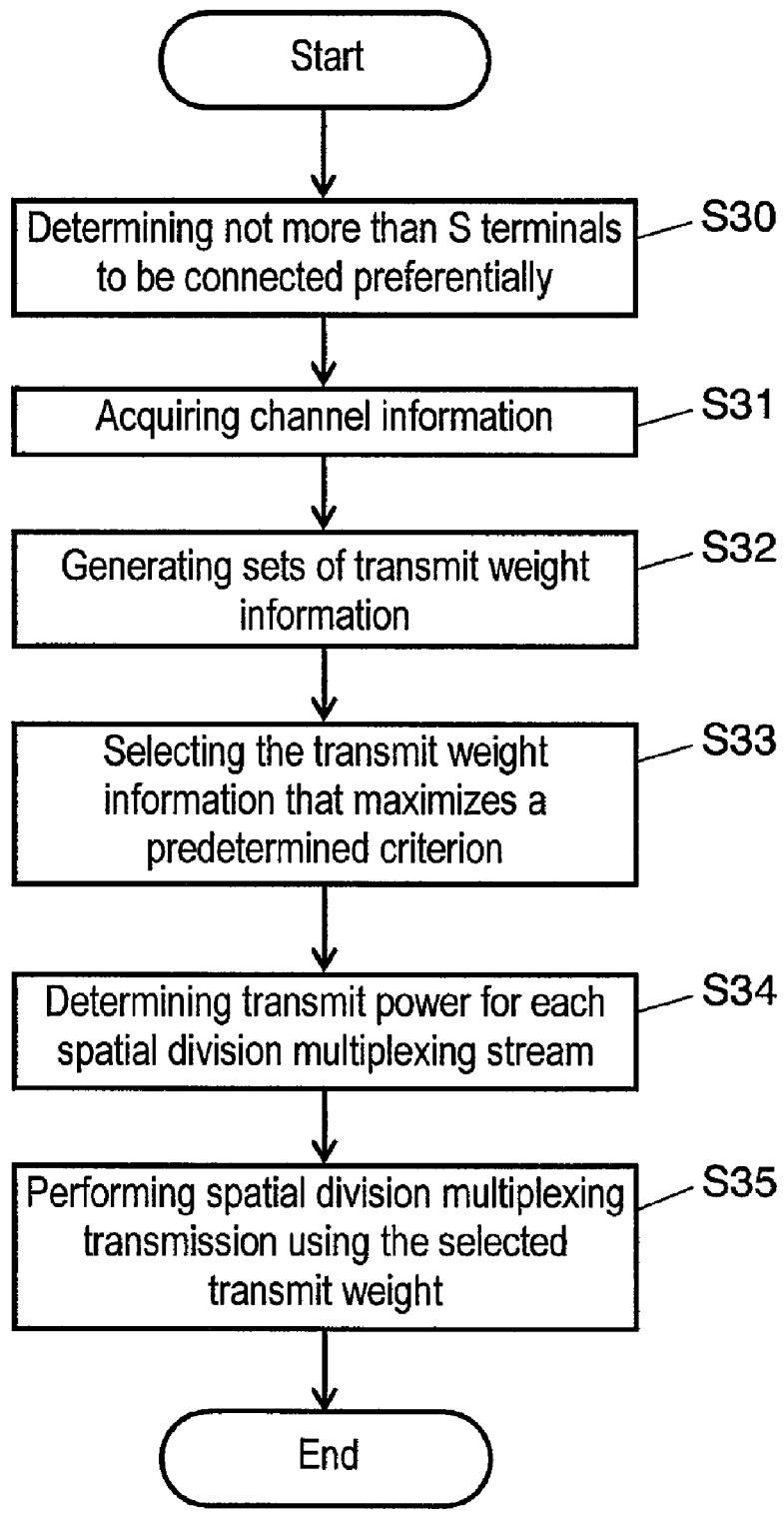

FIG. 5

| Simulation conditions | |
|---|---|
| Transmission system | Single-carrier transmission |
| Coding method (coding rate), modulation system | Convolutional code (R-0.5), 16 QAM |
| Wireless base station antenna | Four-element uniform linear array [element interval DR = 1 wavelength] |
| Receiving unit antenna | Two elements [element interval DR = 0.5 wavelength] |
| Algorithm | Type A: block diagonaoization<br>Type B: (two users, two streams for each user)<br>Type C: eigenvector beam transmission (one user, two streams)<br>Channel estimation: ideal value |
| Directional channel model | Rice factor(K) [dB] = 3, 6, 9<br>AS(T)- 40°, AS (R) = 76°<br>AOD(1) = 0°<br>AOD(2) - 0, 3, 6, 10, 30, 50°<br>AOD(1) = AOA(2) = 0°<br>Quasi-static fading |

The spatial correlation coefficient ρ between the terminals

The spatial correlation coefficient ρ between the terminals

WIRELESS BASE STATION DEVICE, TERMINAL, AND WIRELESS COMMUNICATION METHOD

THIS APPLICATION IS A U.S. NATIONAL PHASE APPLICATION OF PCT INTERNATIONAL APPLICATION PCT/JP2006/307613.

TECHNICAL FIELD

The present invention relates to a wireless base station device which performs spatial division multiplexing transmission with terminals; to the terminals which support spatial division multiplexing transmission; and to a method of wireless communication between the wireless base station device and the terminals.

BACKGROUND ART

In recent years, wireless communication has been increasingly required to have higher capacity and higher speed, so that it has been actively studied to further improve utilization efficiency of finite frequency resources. Of the various methods developed so far, the use of the spatial domain is drawing attention.

One of the spatial domain techniques is to use adaptive array antennas (adaptive antennas). In this technique, a received signal is multiplied by a weighting coefficient to adjust its amplitude and phase. This allows to strongly receive a signal that is intended to be received (hereinafter, a "desired signal") and to suppress the interference signal, thereby reducing co-channel interference and increasing system capacity.

Another of the spatial domain techniques is to use spatial orthogonality in a propagation path. In the technique, different data sequences are transmitted to different terminals using physical channels having the same time, the same frequency, and the same sign.

Spatial division multiplexing transmission technology is described, for example, in non-patent document 1 (T. Ohgane et al, "A study on a channel allocation scheme with an adaptive array in SDMA", IEEE 47th VTC, pages 725-729, vol. 2, 1997). A wireless base station device and terminals for spatial division multiplexing transmission based on this technology can perform spatial division multiplexing transmission if the spatial correlation coefficient between the terminals is lower than a predetermined value. This improves the throughput of the radio communication system and the concurrent user capacity.

However, in such a conventional structure, the wireless base station device is required to detect a spatial correlation coefficient between the terminals and to select the terminals having a spatial correlation coefficient smaller than the predetermined value as the terminals to be connected by spatial division multiplexing (hereinafter, this selecting operation is referred to as "allocation").

Furthermore, the spatial correlation coefficient is required to be detected and updated frequently or periodically because it has the nature of varying with time due to changes in the propagation environment associated with the movement of the terminals or surrounding objects. This complicates both the detection of a spatial correlation coefficient and the allocation of the terminals to be connected by spatial division multiplexing, thereby increasing the processing delay associated therewith.

SUMMARY OF THE INVENTION

The wireless base station device of the present invention includes transmit weight generation sections; a beam selection section; and a transmit beam formation section. The transmit weight generation sections generate transmit weight information according to different algorithms and based on the channel information on a plurality of terminals with which the wireless base station device performs spatial division multiplexing transmission. The transmit weight information is used to form transmit beams to be transmitted to the plurality of terminals. The beam selection section selects one of pieces of transmit weight information generated according to the different algorithms. The transmit beam formation section forms the transmit beams using the selected transmit weight information.

This structure allows to select an optimum transmit weight from among those generated according to different transmit weight generation algorithms. The optimum transmit weight is optimum for the spatial correlation conditions between the terminals detected by the channel information at the time of spatial division multiplexing transmission to the terminals. This achieves spatial division multiplexing transmission robust to the spatial correlation conditions between the terminals, thereby simplifying the conventional allocation process based on the spatial correlation coefficient. As a result, the wireless base station device can be simplified and the processing time required to control the spatial division multiplexing transmission can be reduced. Thus, the wireless base station device, the terminal, and the wireless communication method of the present invention can increase the system capacity by spatial division multiplexing transmission.

BRIEF DESCRIPTION OF THE DRAWINGS

FIG. 3 is a flowchart showing the operation to perform spatial division multiplexing transmission according to the first embodiment of the present invention.

FIG. 5 is a diagram showing simulation conditions according to the first embodiment of the present invention.

Figure 1:
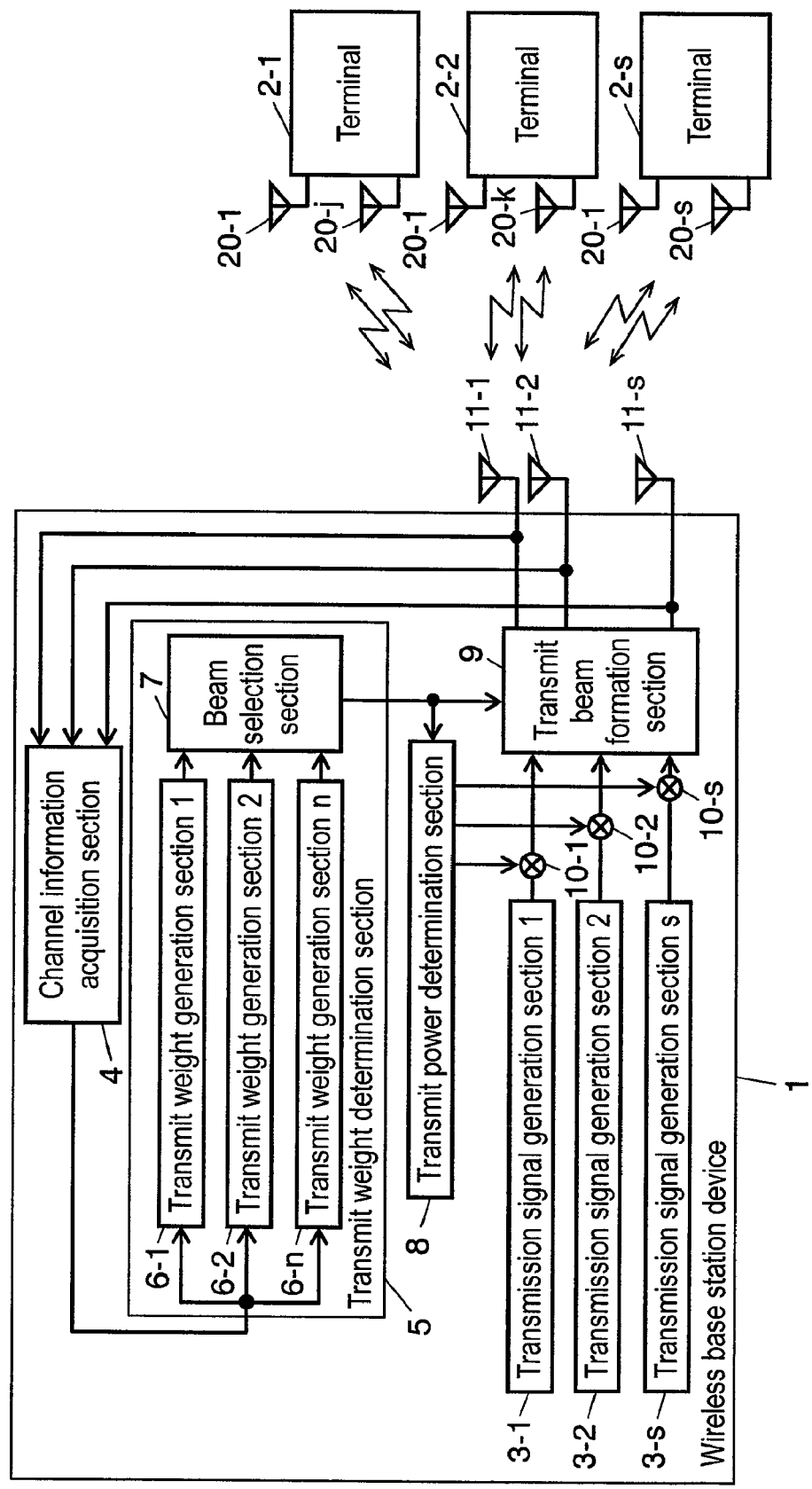
FIG. 1 is a diagram showing a wireless base station device and terminals according to a first embodiment of the present invention.

REFERENCE MARKS IN THE DRAWINGS 1, 100 wireless base station device
2-1, 2-2, 2-s, 2-A, 2-B terminal
3-1, 3-2, 3-s transmission signal generation section
4 channel information acquisition section
5 transmit weight determination section
6-1, 6-2, 6-n transmit weight generation section
7 beam selection section
8 transmit power determination section
9 transmit beam formation section
11-1, 11-2, 11-s, 60 wireless base station antenna
20-1, 20-m, 62 receiving unit antenna
107-a, 107-b selector switch section
216 transmitting unit antenna
221-1, 221-m reception section
222 channel estimation section
223 spatial division demultiplexing section
224 demodulation section

DETAILED DESCRIPTION OF PREFERRED EMBODIMENTS

A wireless base station device and terminals of each embodiment of the present invention are described with reference to drawings.

Note that in the following description, a plurality of sections, a plurality of units, a plurality of terminals, or the like having the same structure are referred to with a single reference number when it is unnecessary to distinguish between them. On the other hand, when it is necessary to distinguish between them, they are referred to with the reference number and another reference number or symbol with a hyphen between them. For example, a plurality of terminals having the same structure may be referred to as "terminals 2" when it is unnecessary to distinguish between them and referred to as "terminals 2-1, 2-2, and 2-s" when it is necessary to distinguish between them.

First Embodiment

Figure 2A:
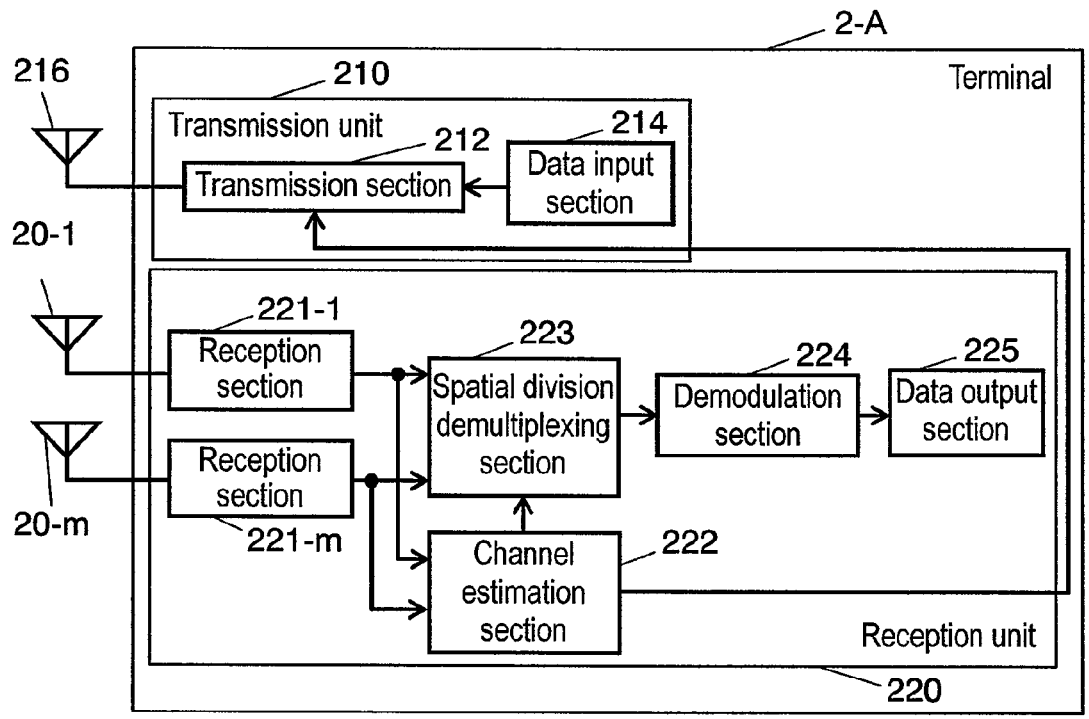
FIG. 2A is a detailed diagram showing a terminal having a plurality of receiving unit antennas according to the first embodiment of the present invention.
Figure 2B:
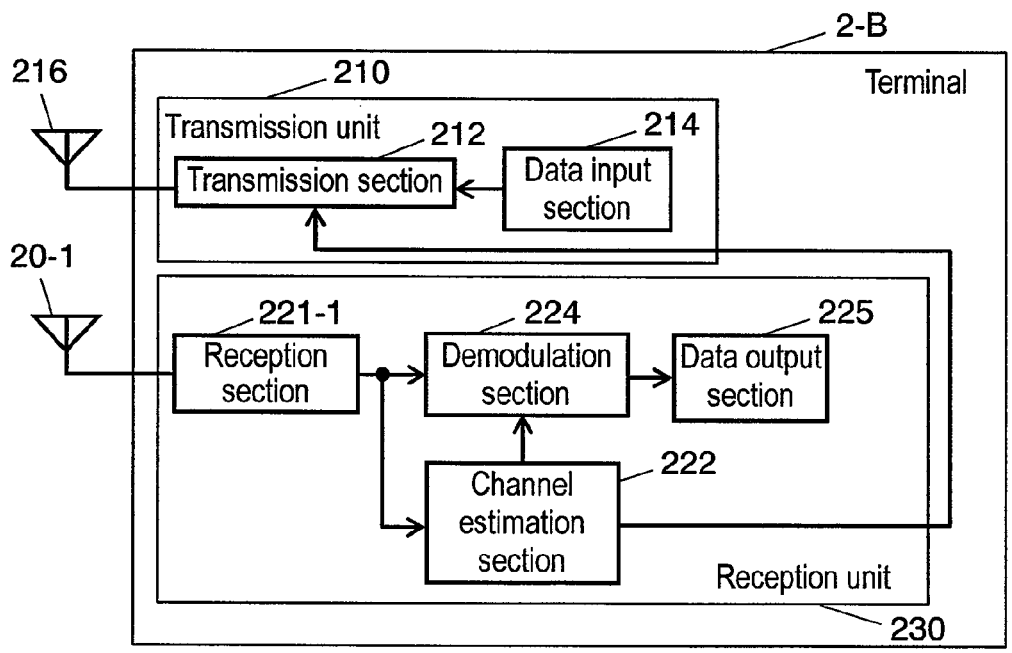
FIG. 2B is a detailed diagram showing a terminal having one receiving unit antenna according to the first embodiment of the present invention.

The structure of a wireless base station device and terminals of a first embodiment of the present invention is shown in FIG. 1. In FIG. 1, terminals 2-1 to 2-s each have antennas 20-1 to 20-j, 20-1 to 20-k, and 20-1 to 20-s, respectively, but may each have only one antenna. FIGS. 2A and 2B show detailed diagrams of a terminal having a plurality of antennas and a terminal having a single antenna, respectively, on the receiving side.

FIG. 1 is a diagram of wireless base station device 1 and terminals 2-1 to 2-s according to the first embodiment of the present invention. The following description of the present embodiment assumes a case where wireless base station device 1 transmits "Ns" spatial streams to "s" terminals where Ns$\geq$s and Ns is a natural number. The transmission from wireless base station device 1 to terminals 2-1 to 2-s is hereinafter referred to as "downlink".

In FIG. 1, wireless base station device 1 of the first embodiment of the present invention includes transmission signal generation sections 3-1 to 3-s; channel information acquisition section 4; transmit weight determination section 5; transmit power determination section 8; transmit beam formation section 9; power factor multipliers 10-1 to 10-s; and wireless base station antennas 11-1 to 11-s. Transmission signal generation sections 3-1 to 3-s generate transmission data sequences to be transmitted to terminals 2-1 to 2-s, respectively, with which wireless base station device 1 performs spatial division multiplexing transmission. Channel information acquisition section 4 extracts channel information of the downlink from signals received from terminals 2-1 to 2-s. Transmit weight determination section 5, which determines a transmit weight, has transmit weight generation sections 6-1 to 6-n and beam selection section 7. Transmit weight generation sections 6-1 to 6-n generate pieces of transmit weight information according to different generation algorithms. Beam selection section 7 selects an optimum one of the pieces of transmit weight information generated by transmit weight generation sections 6-1 to 6-n. Transmit power determination section 8 determines the transmit power for each spatial stream based on the selected transmit weight information and transmits transmit power control information. Transmit beam formation section 9 multiplies each transmission data sequence by a transmit weight based on the selected transmit weight information and then converts the multiplied signals into radio frequency signals so as to form specific transmit beams. Power factor multipliers 10-1 to 10-s multiply the output signal of each of transmission signal generation sections 3-1 to 3-s by a predetermined power factor based on the transmit power control information for each spatial stream determined by transmit power determination section 8. Wireless base station antennas 11-1 to 11-s transmit the radio frequency signals received from transmit beam formation section 9 over an unillustrated transmission medium.

In FIG. 2A, terminal 2-A of the first embodiment of the present invention as a terminal having a plurality of antennas on the receiving side includes transmission unit 210 having transmitting unit antenna 216, and reception unit 220 having receiving unit antennas 20-1 to 20-m.

Transmission unit 210 includes data input section 214 and transmission section 212. Data input section 214 receives data information that the terminal user is going to transmit. Transmission section 212 performs predetermined data processing to channel estimation information transmitted from channel estimation section 222 and converts it to a radio frequency signal.

Reception unit 220 includes reception sections 221-1 to 221-m; channel estimation section 222; spatial division demultiplexing section 223; demodulation section 224; and data output section 225. Reception sections 221-1 to 221-m correspond to receiving unit antennas 20-1 to 20-m, respectively, and convert the radio frequency signals received by receiving unit antennas 20-1 to 20-m into baseband signals. Channel estimation section 222 estimates channel response information of propagation paths of the downlink from the baseband signals. Spatial division demultiplexing section 223 separates and extracts a desired signal from each spatial division multiplexing signal based on the channel response information obtained by channel estimation section 222. Demodulation section 224 restores the transmission data sequences from the separated desired signals. Data output section 225 either outputs the restored reception data sequences to another apparatus or provides the information to the terminal user.

Note that transmitting unit antenna 216 and receiving unit antennas 20-1 to 20-m are treated as different components; however, alternatively, transmitting unit antenna 216 can be integrated with one of receiving unit antennas 20-1 to 20-m.

In FIG. 2B, terminal 2-B of the first embodiment as a terminal having a single antenna on the receiving side includes transmission unit 210 having transmitting unit antenna 216 and reception unit 230 having receiving unit antenna 20-1.

Terminal 2-B differs from terminal 2-A of FIG. 2A in that terminal 2-B has only one receiving unit antenna 20-1, so that reception unit 230 does not include spatial division demultiplexing section 223 performing interference cancellation in spatial domain. Transmitting unit antenna 216 and receiving unit antenna 20-1 are treated as different components; however, alternatively, these antennas can be integrated together in the same manner as terminal 2-A.

The following is a description of the operation of wireless base station device 1 and terminal 2-A or 2-B. Assuming that the channel information of the downlink has been estimated by terminals 2-1 to 2-s, the operation to provide this information to wireless base station device 1 is briefly described.

First, the channel information of a propagation path (unillustrated) estimated by channel estimation section 222 in transmission unit 210 of terminal 2-A or 2-B is transmitted to transmission section 212 and then transmitted to wireless base station device 1 via a control channel or a broadcasting control channel. In other words, a control channel signal or a broadcasting control channel signal carrying the channel information is transmitted to transmitting unit antenna 216 and then emitted therefrom to the propagation path (unillustrated) so as to be transmitted to wireless base station device 1.

The control channel or the broadcasting control channel is a communication channel to exchange information of the efficient operation between wireless base station device 1 and terminal 2-A or 2-B and is different from a communication channel to exchange information between the user of terminal 2-A or 2-B and wireless base station device 1.

The information that the user of terminal 2-A or 2-B is going to transmit is transferred from data input section 214 to transmission section 212 where the information is subjected to predetermined signal processing; converted into a radio frequency signal; and transmitted to wireless base station device 1 via transmitting unit antenna 216.

Later, in wireless base station device 1, channel information acquisition section 4 extracts the channel information contained in the control channel signal or the broadcasting control channel signal transmitted from each of terminals 2-1 to 2-s to wireless base station antennas 11-1 to 11-s. Terminals 2-1 to 2-s have the structure of terminal 2-A or 2-B. Channel information acquisition section 4 then outputs the extracted channel information to transmit weight determination section 5.

The following is a brief description of the operation of spatial division multiplexing transmission by multiplying each of the signals to be transmitted to terminals 2-1 to 2-s by a predetermined transmit weight. Terminals 2-1 to 2-s are to be connected by spatial division multiplexing (allocated) based on the channel information of the downlink which has been notified to wireless base station device 1.

First, in wireless base station device 1, channel information acquisition section 4 extracts the channel information contained in the control channel signal or the broadcasting control channel signal transmitted to wireless base station antennas 11-1 to 11-s from each of terminals 2-1 to 2-s to be connected by spatial division multiplexing (allocated). Channel information acquisition section 4 then outputs the extracted channel information to transmit weight determination section 5. The channel information thus extracted is the channel information of the downlink from wireless base station device 1 to terminals 2-1 to 2-s.

Next, in transmit weight determination section 5, transmit weight generation sections 6-1 to 6-n, which have different transmit weight generation algorithms, generate pieces of transmit weight generation information. This allows transmitting an optimum signal to terminals 2-1 to 2-s to be connected by spatial division multiplexing in accordance with the correlation conditions between terminals 2-1 to 2-s. Then, beam selection section 7 selects the transmit weight information that maximizes a predetermined criterion from among the pieces of transmit weight generation information generated by first to n-th transmit weight generation sections 6-1 to 6-n. Beam selection section 7 then outputs the selected information to transmit power determination section 8 and to transmit beam formation section 9.

Next, transmit power determination section 8 determines a power distribution factor used to determine the transmit power for each spatial division multiplexing stream, based on the received transmit weight information.

On the other hand, transmission signal generation sections 3-1 to 3-s generate signals to be transmitted to terminals 2-1 to 2-s to be connected by spatial division multiplexing (allocated). The signals to be transmitted to terminals 2-1 to 2-s (hereinafter, "transmission data sequences") are outputted after being subjected to predetermined signal processing.

Power factor multipliers 10-1 to 10-s multiply the signal output of each of transmission signal generation sections 3-1 to 3-s by the corresponding one of the power distribution factors determined by transmit power determination section 8.

Transmit beam formation section 9 generates baseband symbol data by multiplying each of transmission data frame sequence signals (described later) by a transmit weight used to form a predetermined (selected) beam, based on the transmit weight information from beam selection section 7. The transmission data frame sequence signals have been obtained by the multiplication between the signal outputs and the power distribution factors. After this, in transmit beam formation section 9, digital data, which are the baseband symbol data, are digital-analog converted by an unillustrated digital-analog converter, filtered by an unillustrated band limiting filter, and converted into carrier frequencies by an unillustrated frequency converter, thereby being outputted as radio frequency signals.

Wireless base station antennas 11-1 to 11-s emit the received radio frequency signals to unillustrated propagation paths (space) so as to transmit these signals to terminals 2-1 to 2-s to be connected by spatial division multiplexing.

How terminals 2-1 to 2-s receive the spatially multiplexed signals transmitted from wireless base station device 1 will be described later. Before that, the operation flow including scheduling for wireless base station device 1 to perform spatial division multiplexing transmission of the downlink is described first, and then the operation and criterion of each step of the flow and weight generation algorithm are described in detail.

FIG. 3 is a flowchart showing the operation for wireless base station device 1 to perform spatial division multiplexing transmission of the downlink. The spatial division multiplexing transmission in wireless base station device 1 of the downlink is described as follows with reference to FIGS. 1 to 3. To make the explanation easy to understand, the operation is described briefly first and then in detail.

First, among terminals 2-1 to 2-s, not more than s terminals 2-k where s is a natural number and k=1 to s which are to be connected (allocated) preferentially in downlink transmission are selected by predetermined packet scheduling (Step S30). Examples of the scheduling include Maximum CIR and Proportional Fairness, which are based on the signal-to-interference power ratio (hereinafter referred to as "SIR") as a value indicating the reception quality of the terminals. These two examples are disclosed as well-known techniques in A. Jalali et al, "Data Throughput of CDMA-HDR a High Efficiency-High Data Rate Personal Communication Wireless System" IEEE VTC 2000-Spring, pp. 1854-1858.

Next, channel information acquisition section 4 acquires the downlink channel information on allocated terminals 2-1 to 2-s (Step S31). The downlink channel information can be acquired by making terminals 2-1 to 2-s feedback the observed channel information in advance to wireless base station device 1. In the case of the TDD (Time division duplex) system, the downlink channel information can be acquired by using the relativity of a propagation path and based on the known signal sequences transmitted from terminals 2-1 to 2-s in the uplink.

In the following description, the channel estimation matrix on k-th terminal 2-k is represented as "H(k)", which is the channel information acquired under the assumption of flat fading. Flat fading represents the circumstance in which fading has a uniform effect on the frequency bands to be considered, so that there is no need to consider the effect of multipath. The channel estimation matrix consists of Nr(k) rows and Nt columns. The Nr(k) rows correspond to the number of receiving antennas in k-th terminal 2-k and the Nt columns correspond the number of wireless base station antennas. The j-th row s-th column element of the channel estimation matrix represents a complex channel response when the signal transmitted from the s-th antenna of wireless base station device 1 is received by j-th receiving antenna 20-j of terminal 2-k.

Next, 1-th to n-th transmit weight generation sections 6-1 to 6-n generate pieces of transmit weight information according to different weight generation algorithms (Step S32).

Beam selection section 7 selects the transmit weight information that maximizes a predetermined criterion from among the pieces of transmit weight information (Step S33). The transmit weight information generated for k-th terminal 2-k by n-th transmit weight generation section 6-n is referred to as transmit weight Wn(j) where j=1 to Nu(k); Nu(k) is the number of spatial division multiplexing streams to be transmitted to terminal 2-k; and k=1 to s. Wn(j) is a column vector having Nt elements and the norm is normalized to 1 (except for a zero weight). When the total number of spatial division multiplexing streams is Ns, the total number of Nu(k) to be transmitted to all terminals 2-1 to 2-s to be concurrently connected by spatial division multiplexing is equal to Ns.

Transmit power determination section 8 determines a transmit power distribution factor for each spatial stream based on the transmit weight information selected by beam selection section 7. The sum of the transmit powers for all the spatial streams is required not to exceed a predetermined transmit power level. Power factor multipliers 10-1 to 10-s multiply the signal output of each of transmission signal generation sections 3-1 to 3-s by the corresponding one of the power distribution factors determined by transmit power determination section 8 (Step S34).

Transmit beam formation section 9 generates baseband symbol data by multiplying each of the transmission data frame sequence signals by a transmit weight used to form the selected beam, based on the transmit weight information from beam selection section 7. After this, in transmit beam formation section 9, digital data, which are the baseband symbol data, are digital-analog converted by the unillustrated digital-analog converter, filtered by the unillustrated band limiting filter, and converted into carrier frequencies by the unillustrated frequency converter, thereby being outputted as radio frequency signals. Wireless base station antennas 11-1 to 11-s emit the received radio frequency signals to the unillustrated propagation paths (space) (Step S35).

Such is a brief description of the operation for wireless base station device 1 to perform spatial division multiplexing transmission of the downlink shown in the flowchart of FIG. 3. The items [1] to [3] below are described in detail as follows.

[1] Transmit weight generation algorithms implemented in transmit weight generation sections 6-1 to 6-n

[2] How beam selection section 7 selects transmit weight information

[3] How to determine the transmit power distribution factor

A Detailed Description on [1] Transmit Weight Generation Algorithms Implemented in Transmit Weight Generation Sections 6-1 to 6-n The transmit weight generation algorithms implemented in transmit weight generation sections 6-1 to 6-n are described in detail as follows. Transmit weight generation sections 6-1 to 6-n implement the following three basically different weight generation algorithms.

Type A: An algorithm to generate transmit weights which can improve the reception quality of a predetermined terminal 2 with a restriction to minimize the interference to the other terminals 2

Type B: An algorithm to generate transmit weights which can improve the reception quality of a predetermined terminal 2 without a restriction to reduce the interference to the other terminals 2

Type C: An algorithm to generate a single transmit weight

Figure 6:
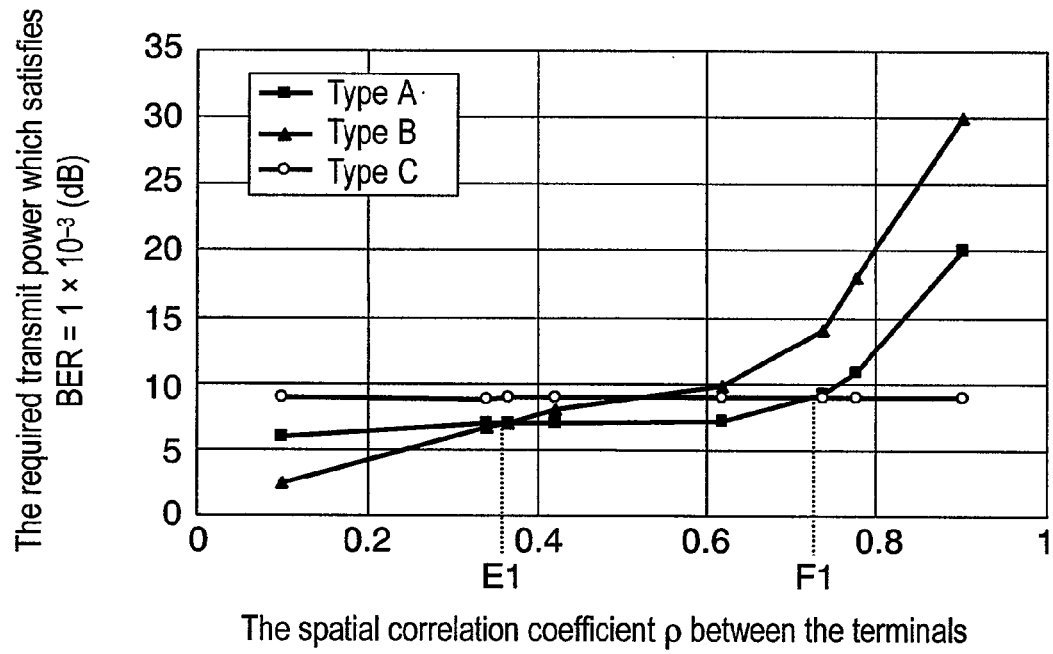
FIG. 6 is a graph showing simulation results of the relationship between the correlation coefficient and communication quality in the three different algorithms when Ricean factor K=3 dB according to the first embodiment of the present invention.
Figure 7:
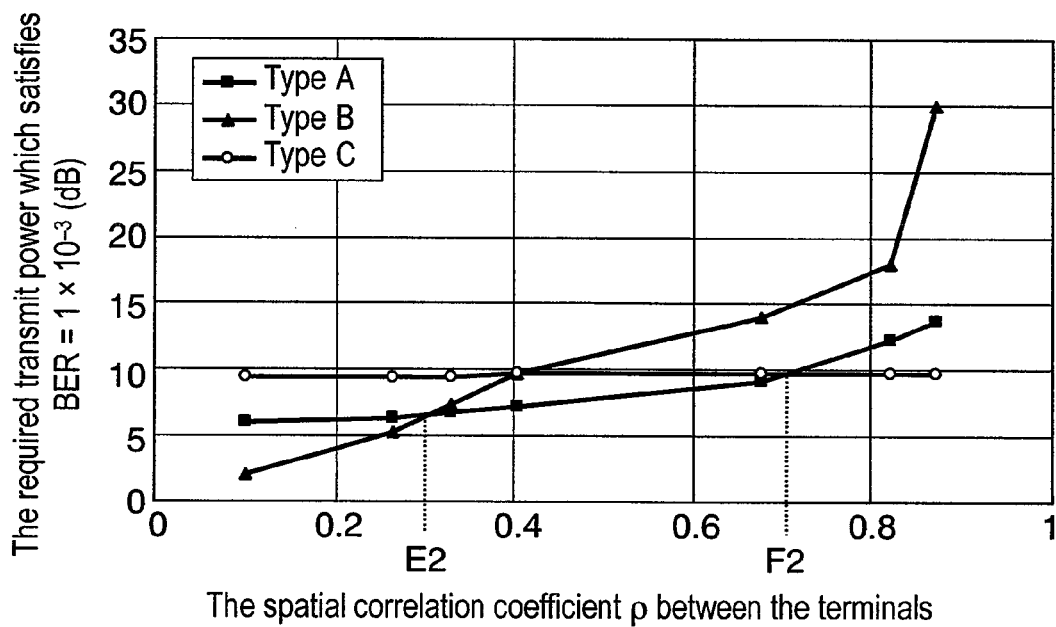
FIG. 7 is a graph showing simulation results of the relationship between the correlation coefficient and communication quality in the three different algorithms when Ricean factor K=6 dB according to the first embodiment of the present invention.
Figure 8:
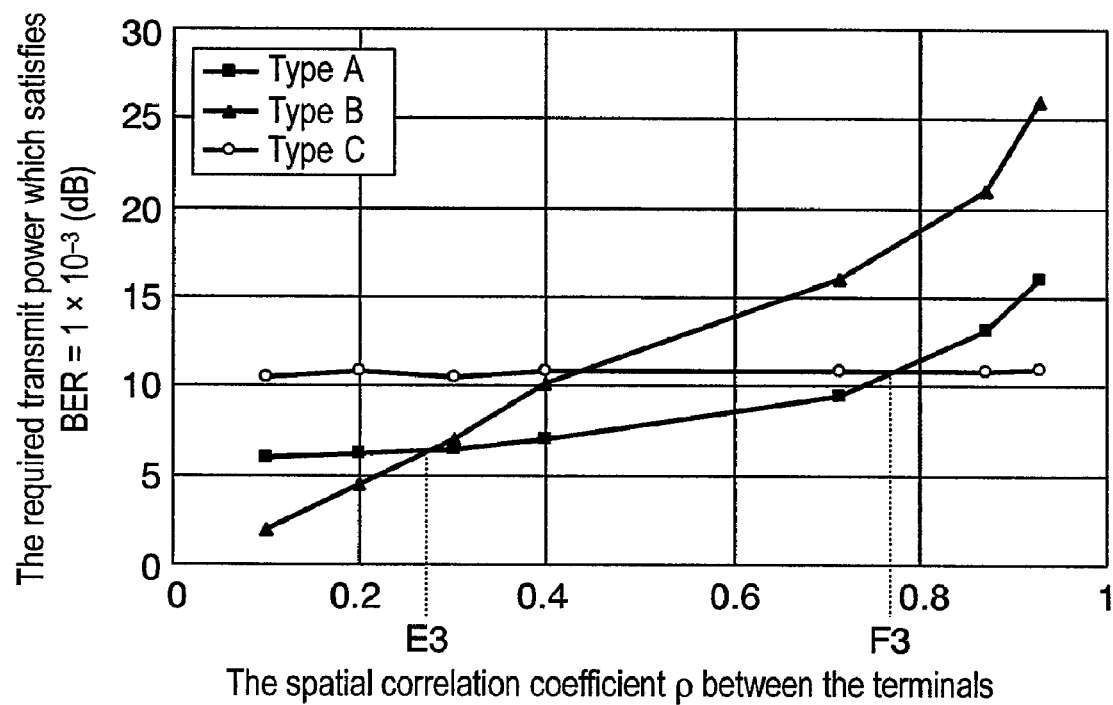
FIG. 8 is a graph showing simulation results of the relationship between the correlation coefficient and communication quality in the three different algorithms when Ricean factor K=9 dB according to the first embodiment of the present invention.

It has turned out through simulations that the use of the three different algorithms can generate transmit weights that can meet various levels of correlation conditions between the terminals. FIGS. 6 to 8 are graphs showing simulation results of the relationship between the spatial correlation coefficient "ρ" and communication quality when an exit angle difference AOD (2) (described later) between the terminals is changed so as to change the spatial correlation coefficient "ρ" between the terminals. The simulation is performed under the conditions of FIG. 5 in directional channel models shown in FIGS. 4A to 4E. The required transmit power which satisfies "bit error rate (BER)=1×10$^{-3}$" is used as the communication quality evaluation value (note that normalization is performed by the transmit power for single antenna transmission). As the value is smaller, the communication quality of the type is better.

Figure 4A:
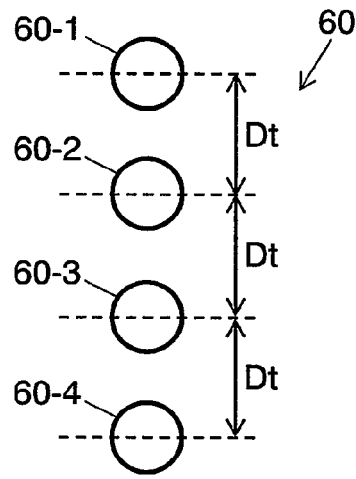
FIG. 4A shows an antenna element arrangement of a wireless base station antenna which is used in a simulation of the relationship between a correlation coefficient and communication quality in three different algorithms according to the first embodiment of the present invention.
Figure 4B:
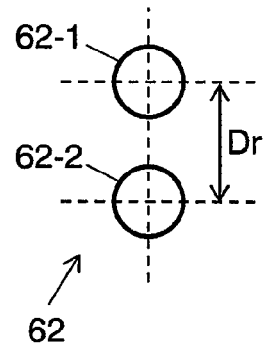
FIG. 4B shows an antenna element arrangement of a receiving unit antenna which is used in the simulation of the relationship between the correlation coefficient and communication quality in the three different algorithms according to the first embodiment of the present invention.

FIG. 4A shows an antenna element arrangement of wireless base station antenna 60, and FIG. 4B shows an antenna element arrangement of receiving unit antenna 62 of a terminal when these elements are used in a simulation. In wireless base station antenna 60, four transmit antenna elements 60-1 to 60-4 are arranged at regular intervals of "Dt" on a straight line. In receiving unit antenna 62, two receiving antenna elements 62-1 to 62-2 are arranged at regular intervals of "Dr".

Figure 4C:
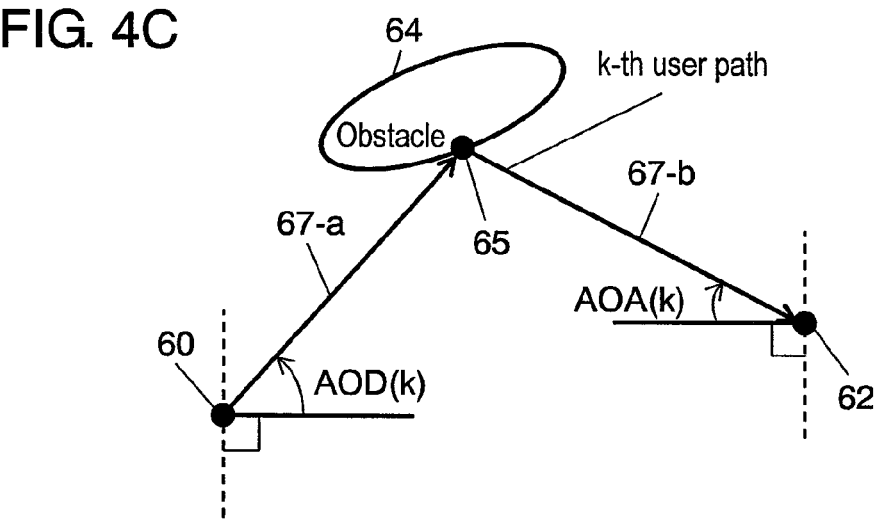
FIG. 4C is a model diagram showing radio propagation between a wireless base station antenna and a receiving unit antenna which are used in the simulation of the relationship between the correlation coefficient and communication quality in the three different algorithms according to the first embodiment of the present invention.

FIG. 4C is a diagram showing how the radio wave radiated from wireless base station antenna 60 is reflected at reflection point 65 by obstacle 64 and received by receiving unit antenna 62 via path 67-*a* and path 67-*b*. Path 67-*a* indicates the direction of the radio wave to be radiated toward obstacle 64. Path 67-*b* indicates the direction of the radio wave to be radiated from reflection point 65 of obstacle 64. The angle, which is formed between the normal of the straight line connecting transmit antenna elements 60-1 to 60-4 on the side of obstacle 64 and path 67-*a*, is defined as an exit angle difference AOD. The angle, which is formed between the normal line of the straight line connecting receiving antenna elements 62-1 and 62-2 on the side of obstacle 64 and path 67-*b*, is defined as an incident angle difference AOA.

The communication path between wireless base station antenna 60 and receiving unit antenna 62 of the k-th terminal (user) is referred to as the k-th user path. The AOD and the AOA in this case are referred to as an AOD (k) and an AOA (k), respectively. The k-th user path consists of path 67-*a* and path 67-*b*.

Figure 4D:
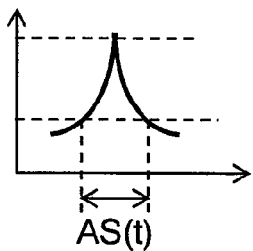
FIG. 4D is a model diagram showing a beam width on a transmitting side, which is used in the simulation of the relationship between the correlation coefficient and communication quality in the three different algorithms according to the first embodiment of the present invention.
Figure 4E:
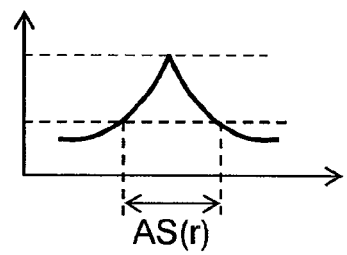
FIG. 4E is a model diagram showing a beam width on a receiving side, which is used in the simulation of the relationship between the correlation coefficient and communication quality in the three different algorithms according to the first embodiment of the present invention.

FIGS. 4D and 4E are diagrams showing a beam width on the transmitting side of path 67-*a* and a beam width on the receiving side of path 67-*b*, respectively. The horizontal axis represents the beam width and the vertical axis represents the field strength. The width between the peak value of the field strength and a point 3 dB below the peak value is defined as a beam width. The angle spread on the transmitting side is defined as AS(t) and the angle spread on the receiving side is defined as AS(r). When the wireless base station antenna height is greater than the surrounding building height, AS(r) tends to be larger than AS(t).

FIG. 6 shows the case where Ricean factor K=3 dB. In FIG. 6, the horizontal axis represents the spatial correlation coefficient "ρ" between the terminals, and the vertical axis represents the required transmit power as signal quality which satisfies "bit error rate (BER)=1×10$^{-3}$". The relationship between the signal quality and the spatial correlation coefficient between the terminals is plotted with black squares for Type A; with black triangles for Type B; and white circles for Type C.

In FIG. 6, the value of the spatial correlation coefficient "ρ" at the intersection of Type B and Type A is referred to as E1, and the value of the spatial correlation coefficient "ρ" at the intersection of Type B and Type C is referred to as F1. The signal quality of each of Types A to C changes as follows so as to show the spatial correlation coefficient-to-communication quality characteristics in FIG. 6. Type B has the best communication quality when the spatial correlation coefficient "ρ" is from 0 to E1; Type A has the best communication quality when the coefficient "ρ" is from E1 to F1; and Type C has the best communication quality when the coefficient "ρ" is from F1 to 1.

FIG. 7 shows the case where Ricean factor K=6 dB, and FIG. 8 shows the case where Ricean factor K=9 dB. Both cases have results similar to the case shown in FIG. 6. More specifically, regardless of the value of the Ricean factor K, the spatial correlation coefficient-to-communication quality characteristics can be divided into three or more regions, and in each of the regions, one of Types A to C has the best communication quality.

A Ricean factor K is a parameter showing line-of-sight conditions between wireless base station antenna 60 and receiving unit antenna 62. In general, when a Ricean factor K is large, the wireless base station antenna height is large, indicating a propagation model in the cellular environment which is relatively likely to be in line-of-sight environments. When the Ricean factor K is small, on the other hand, both wireless base station antenna 60 and receiving unit antenna 62 are lower in height than the surrounding buildings, indicating a propagation model not in line-of-sight environments.

These results indicate the following. When the correlation between the terminals is low (for example, the spatial correlation coefficient "ρ" is 0 or more and 0.3 or less), it is advantageous to use Type B, which uses the degrees of freedom of the antennas on the transmitting side to improve the communication quality with terminals 2.

When the correlation is very high (for example, the spatial correlation coefficient "ρ" is 0.8 or more and 1 or less), it is advantageous to use Type C, which does not involve spatial division multiplexing transmission. When the correlation is intermediate (for example, the spatial correlation coefficient "ρ" is 0.4 or more and 0.6 or less), it is advantageous to use Type A, which uses the degrees of freedom of the antennas on the transmitting side to eliminate the interference between the terminals. More specifically, in order to select one of the aforementioned three algorithms according to the spatial correlation coefficient "ρ", the second type (Type B) is selected when the spatial correlation coefficient "ρ" is in the region where $0 \leq \rho \leq 0.3$; the first type (Type A) is selected when the coefficient "ρ" is in the region where $0.4 \leq \rho \leq 0.6$; and the third type (Type C) is selected when the coefficient "ρ" is in the region where $0.8 \leq \rho \leq 1$. Thus, the most effective algorithm can be selected from among the different algorithms according to the spatial correlation coefficient so as to maintain high communication quality, thereby achieving spatial division multiplexing transmission.

Type A algorithm includes algorithms (A-1), (A-2), and (A-3). Algorithm (A-1), which is used in the case where terminals 2 have a single antenna, includes null beam forming (ZF (Zero-Forcing) beam) to steer a null in the direction toward other terminals 2 and a MMSE (Minimum-Mean-Square-Error) beam. Algorithms (A-2) and (A-3) are used in the case where terminals 2 have a plurality of antennas. Algorithm (A-2) is a block diagonalization weight algorithm.

Algorithm (A-3) is a joint weight generation algorithm in which block diagonalization is performed on the assumption that a reception weight is received using maximum ratio combining reception weight.

Type B algorithm includes algorithms (B-1) and (B-2). The algorithm (B-1) is eigenvector beamforming which uses right singular vectors corresponding to the same number of singular values as the number of spatial division multiplexing streams Nu(k) to be transmitted to k-th terminal 2-$k$ as singular values obtained by performing a singular value decomposition of channel estimation matrix H(k) on k-th terminal 2-$k$. The algorithm (B-2) is the selection of the beam whose main beam direction is nearest to the direction of the specific terminal 2 to which to perform spatial division multiplexing transmission. The beam is selected from among a plurality of fixed beam patterns having different main beam directivities from each other. The fixed beam patterns can be, for example, orthogonal beam patterns or beam patterns having different main beam directions at regular intervals.

Type C algorithm includes a single transmit weight algorithm in which an eigenvector beam is transmitted only to a single terminal 2 having the highest priority of terminals 2-1 to 2-$s$, and a zero weight having all zero elements is generated for the other terminals 2.

The following is a detailed description of each weight generation algorithm included in Type A algorithm.

(A-1) Null beam forming to steer a null in the direction toward other terminals 2:

When a ZF beam is formed, transmit weight Wk(j) on k-th terminal 2-$k$ is calculated as follows. Transmit weight Wk(j) where j=1 to Nu(k); Nu(k) is the number of spatial division multiplexing streams to be transmitted to terminal 2-$k$; and s is the total number of terminals to be connected by spatial division multiplexing satisfies Equation 1 below. Transmit weight Wk(j) is calculated for channel estimation matrices H(l) of all terminals 2 to be concurrently connected except for channel estimation matrix H(k) on k-th terminal 2-$k$.

$$H(l)Wk(j)=0 \quad \text{Equation 1}$$

However, when the number of spatial division multiplexing streams to be transmitted to terminal 2-1 is, for example, Nu(1)=3, values satisfying Equation 1 are calculated on three elements W1(1) to W1(3) composing column vector W1($j$), which is the transmit weight on terminal 2-1.

As described above, k is varied from 1 to s so as to calculate all the transmit weights on terminals 2-1 to 2-$s$. In other words, Ns transmit weights, the same number as the total number of spatial division multiplexing streams, are calculated.

When a MMSE beam is formed, all terminals 2 on the receiving side are assumed to have an equal noise power $\delta^2$ and set to a predetermined value, thereby generating transmit weight Wn(j) which satisfies Equation 2 and Equation 3 maximizing the signal-to-interference power ratio (SIR) in each of terminals 2 where j=1 to s, and s is the total number of terminals to be connected by spatial division multiplexing.

$$F = \left(Q^H Q + \frac{\sigma^2}{N_t}I\right)^{-1} Q^H = [W_n(1)W_n(2) \ldots W_n(s)] \quad \text{Equation 2}$$

$$Q = \begin{bmatrix} H(1) \\ H(2) \\ \vdots \\ H(s) \end{bmatrix} \quad \text{Equation 3}$$

where the superscript "H" indicates a complex conjugate.

(A-2) Block Diagonalized Weight Algorithm:

Transmit weight Wn(j) where j=1 to Nu(k) on k-th terminal 2-$k$ is calculated as follows. First, matrix Dk shown in Equation 4 is generated as a new matrix based on channel estimation matrices H(l) where l=1, 2, . . . s, and l≠k of all the terminals to be concurrently connected except for channel estimation matrix H(k) on k-th terminal 2-$k$.

$$D_k = \begin{bmatrix} H(1) \\ \vdots \\ H(k-1) \\ H(k+1) \\ \vdots \\ H(s) \end{bmatrix} \quad \text{Equation 4}$$

Next, right singular matrix Vk shown in Equation 5 is calculated by performing a singular value decomposition of Dk.

$$D_k = U_k B_k V_k^H \quad \text{Equation 5}$$

Right singular matrix Vk thus obtained consists of Nt rows and Nt columns, and the matrix obtained by extracting the right singular vectors corresponding to the singular value "0" (a numerical zero) is referred to as Rk. Matrix Rk consists of Nt rows and Nq columns. Nq is shown in Equation 6 below.

$$N_q = N_t - \sum_{\substack{j=1 \\ j \neq k}}^{s} N_r(j) \quad \text{Equation 6}$$

Eigenvector beam transmission is performed using matrix Rk consisting of Nt rows and Nq columns based on a new matrix Ek shown in Equation 7.

$$E_k = H(k)R_k \quad \text{Equation 7}$$

Matrix Ek consists of Nr(k) rows and Nq columns. Nu(k) singular values, which are the same number as the total number of spatial division multiplexing streams to be transmitted to k-th terminal 2-$k$, are selected in descending order from among the right singular vectors obtained by performing a singular value decomposition of Ek. The right singular vectors corresponding to the selected singular values are used as transmit weight Wn(j).

As described above, k is varied from 1 to s so as to calculate the transmit weights on terminals 2-1 to 2-$s$. In other words, Ns transmit weights, which are the same number as the total number of spatial division multiplexing streams, are calculated.

(A-3) Joint weight generation algorithm in which block diagonalization is performed on the assumption that a reception weight is received using maximum ratio combining reception weight:

Transmit weight Wn(j) where j=1 to Nu(k) on k-th terminal 2-$k$ is calculated as follows. First, as shown in Equation 8, Nu(k) singular values, which are the same number as the total number of spatial division multiplexing streams to be transmitted to k-th terminal 2-$k$, are selected in descending order from among left singular matrices Uk obtained by performing a singular value decomposition of channel estimation matrix H(k) on k-th terminal 2-$k$. The left singular vectors corresponding to the selected singular values are used as reception weight matrix Gk in k-th terminal 2-k. Reception weight matrix Gk consists of Nr(k) rows and Nu(k) columns.

$$H(k) = U_k B_k V_k^H \qquad \text{Equation 8}$$

The calculation of reception weight matrix Gk is performed for all terminals 2.

Next, a new channel estimation matrix Dk shown in Equation 9 is calculated using channel estimation matrices H(m) and reception weight matrices Gm, where m=1 to s and m≠k except for channel estimation matrix H(k) and reception weight matrix G(k) on k-th terminal 2-k.

$$D_k = \begin{bmatrix} E_1 H(1) \\ \vdots \\ E_{k-1} H(k-1) \\ E_{k+1} H(k+1) \\ \vdots \\ E_s H(s) \end{bmatrix} = \begin{bmatrix} G_1^H H(1) \\ \vdots \\ G_{k-1}^H H(k-1) \\ G_{k+1}^H H(k+1) \\ \vdots \\ G_s^H H(s) \end{bmatrix} \qquad \text{Equation 9}$$

Next, right singular matrix Vk shown in Equation 5 is calculated on matrix Dk thus obtained. Right singular matrix Vk thus obtained consists of Nt rows and Nt columns, and the matrix obtained by extracting the right singular vectors corresponding to the singular value "0" (a numerical zero) is referred to as Rk. Matrix Rk consists of Nt rows and Nv columns. Nv is shown in Equation 10.

$$N_v = N_t - \sum_{\substack{j=1 \\ j \neq k}}^{s} N_u(j) \qquad \text{Equation 10}$$

Eigenvector beam transmission is performed using matrix Rk consisting of Nt rows and Nv columns based on a new matrix Ek shown in Equation 7. Matrix Ek consists of Nr(k) rows and Nv columns. Nu(k) singular values, which are the same number as the total number of spatial division multiplexing streams to be transmitted to k-th terminal 2-k, are selected in descending order from among the right singular vectors obtained by performing a singular value decomposition of Ek. The right singular vectors corresponding to the selected singular values are used as transmit weight Wn(j). As described above, k is varied from 1 to s so as to calculate the transmit weights on terminals 2-1 to 2-s. In other words, Ns transmit weights, the same number as the total number of spatial division multiplexing streams, are calculated.

Algorithm (A-3) is on the assumption that a reception weight is received using maximum ratio combining reception weight so as to reduce the constraint on the formation of a directional null. As a result, unlike the algorithm (A-2), algorithm (A-3) can be used even when the total number of the receiving antennas of terminals 2 to be concurrently connected is larger than the number Nt of transmit antennas of wireless base station device 1. Furthermore, unlike algorithm (A-2) in which the formation of transmit weights is restricted by the number of the receiving antennas, in algorithm (A-3) the formation of transmit weights is restricted by the number of spatial division multiplexing streams. This provides algorithm (A-3) with an advantage of having better reception quality than algorithm (A-2) when the number Nu(k) of spatial division multiplexing streams to be transmitted to terminal 2-k is smaller than the number Nr(k) of the receiving antennas of terminal 2-k.

A Detailed Description on [2] How Beam Selection Section 7 Selects Transmit Weight Information How beam selection section 7 selects transmit weight information is described in detail as follows. Beam selection section 7 selects transmit weight information that maximizes a predetermined criterion from among the pieces of transmit weight information generated by first to n-th transmit weight generation sections 6-1 to 6-n. The predetermined criterion can be a predicted value of physical quantity indicating the quality of signals received by terminals 2, such as signal-to-noise power ratio (hereinafter, SNR) or signal-to-interference and noise power ratio (hereinafter SINR).

How to select a specific transmit weight is described as follows using Equations. First, Ns spatial streams at time "t" is expressed by Equation 11, and signal Yn(t) to be transmitted is expressed by Equation 12 on the assumption that the transmit weight information generated by n-th transmit weight generation section 6-n has been selected where k=1 to Ns, and Yn(t) is a column vector consisting of Nt elements. Equation 13 shows the transmit power for each of the spatial division multiplexing streams to be transmitted to terminals 2-1 to 2-s, and the transmit power is assumed to be uniform. Wn(k) is a transmit weight (a column vector having Nt elements) on k-th spatial stream (Equation 11) generated by n-th transmit weight generation section 6-n.

$$s_k(t) \qquad \text{Equation 11}$$

where the subscript "k" indicates the k-th spatial stream and k=1, 2, ..., Ns.

$$Y_n(t) = [W_n(1) \ W_n(2) \ \ldots \ W_n(Ns)] \begin{bmatrix} P_1 & 0 & \ldots & 0 \\ 0 & P_2 & \ddots & \vdots \\ \vdots & \ddots & \ddots & 0 \\ 0 & \ldots & 0 & P_{Ns} \end{bmatrix} \begin{bmatrix} s_1(t) \\ s_2(t) \\ \vdots \\ s_{Ns}(t) \end{bmatrix} \qquad \text{Equation 12}$$

$$P_k \qquad \text{Equation 13}$$

where the subscript "k" indicates the k-th spatial stream and k=1, 2, ..., Ns.

Next, a reception signal (Equation 14) of terminals 2 is predicted. The reception signal (Equation 14) can be expressed by Equation 15 using channel information H(k) on k-th terminal 2-k.

$$Z_k(t) \qquad \text{Equation 14}$$

$$Z_k(t) = H(k) Y_n(t) \qquad \text{Equation 15}$$

When the number Nr(k) of antennas of terminal 2-k is 1, the SINR is obtained by Equation 16. The symbol "δ" represents a noise power on the assumption that Gaussian additive noise is added to the interference, and is hereinafter treated as a predetermined fixed value.

$$SINR_n(k) = \frac{|H(k) W_n(k)|^2}{\sum_{j=1, j \neq k}^{Ns} |H(k) W_n(j)|^2 + \sigma^2} \qquad \text{Equation 16}$$

When terminal 2-k has more than one antenna, SINR estimation is performed using Equation 17 on the assumption that the directivity is formed using reception weight R(k). Reception weight R(k) represents a column vector having Nr(k) elements the same number as the number of receiving unit antennas of terminal 2-$k$. In Equation 17, the subscript "n" represents the number of user terminals, that is, the total number of terminals 2 to be connected by spatial division multiplexing, which corresponds to terminals 2-1 to 2-$s$ in the present embodiment.

$$SINR_n(k) = \frac{|R(k)H(k)W_n(k)|^2}{\sum_{j=1, j \neq k}^{Ns} |R(k)H(k)W_n(j)|^2 + \sigma \|R(k)\|^2} \qquad \text{Equation 17}$$

In order to calculate a virtual reception weight in terminals 2, it is possible to use MMSE algorithm or ZF algorithm when there is an interference component, and to use a maximum ratio combining reception weight when there is no need to consider an interference component.

When the block diagonalization weight algorithm is used to calculate a transmit weight, the same number of singular values as the number of spatial division multiplexing streams to be transmitted to terminal 2-$k$ are selected in descending order from among the singular values obtained by performing a singular value decomposition of channel estimation matrix H(k). The left singular vectors corresponding to the selected singular values can be used.

Another possible algorithm is to prepare a plurality of weight information candidates to be used as the aforementioned reception weight and to apply SINR estimation to each candidate, thereby selecting the optimum combination of a reception weight and a transmit weight candidate. This algorithm requires a large processing capacity for the SINR estimation, but it is possible to obtain the best communication quality in various propagation environments.

Through the aforementioned calculations, SINRn(k) of each user is calculated using Wn(k) expressed by Equation 17 as a variable. SINRn(k) is calculated for all of the first to n-th transmit weight generation sections. Then, beam selection section 7 selects transmit weight Ws(k) where k=1 to Ns. Transmit weight Ws(k) is the output information of s-th transmit weight generation section 6-$s$ which generates the transmit weight making the total SINRn(k) of all users largest.

It is possible to perform weighting-adding according to the QoS (allowable delay, transmission request rate, or the like) of spatial division multiplexing streams. For example, a high weighing is given to a user (terminal) which requires real-time signal transmission with a small allowable delay so as to provide preferential signal transmission. This reduces the number of retransmission times, thereby improving total system throughput.

It is alternatively possible to perform weighting-adding according to the transmission request rate. For example, a high weighting coefficient is given to a spatial division multiplexing stream having a high transmission request rate so as to provide preferential signal transmission. This improves total system throughput.

A Detailed Description on [3] How to Determine the Transmit Power Distribution Factor How to determine the transmit power distribution factor is described in detail as follows. Although the power distribution can be simply based on equal power distribution, it is possible to utilize the following algorithms (1) and (2) to improve throughput or to reduce transmit power.

(1) An Algorithm to Improve Capacity (Throughput):

SNR(k) is measured as the reception quality of terminal 2-$k$ to receive a broadcast signal from wireless base station device 1, and the measured information is notified in advance to wireless base station device 1. Water-filling algorithm is used based on a theoretical capacity obtained through the calculation of each SNR(k) and each channel estimation matrix. The water-filling algorithm is an algorithm for distributing power preferentially to streams with a good SNR value. As a result, a power distribution ratio is determined for each spatial stream and is used as a power distribution factor.

In this technique, the power distribution ratio is preferably corrected because in general the power distribution ratio takes discrete values according to changes in modulation level and coding rate (hereinafter, MCS). In that case, the following correction algorithm is used. A SINR to be received by terminal 2-$k$ is predicted. When the predicted SINR exceeds a required SINR in the MCS that achieves the maximum rate, the surplus is distributed to the spatial streams to be transmitted to the other terminals 2 so as not to supply the surplus to terminal 2-$k$. In contrast, when the predicted SINR is below the required SINR in the MCS that achieves the minimum rate, the power distribution ratio for the spatial streams to be transmitted to the other terminals 2 is reduced so as to distribute power preferentially to the spatial stream to be transmitted to terminal 2-$k$.

(2) An algorithm to Reduce Transmit Power:

SNR(k) is measured as the reception quality of terminal 2-$k$ to receive a broadcast signal from wireless base station device 1, and the measured information is notified in advance to wireless base station device 1.

SNR(k) thus obtained is used to estimate a noise power so as to predict SNRt(j) where j=1 to Nu(k). SNRt(j) is expressed by Equation 18 as the SNR in spatial division multiplexing stream transmission. In Equation 18, Pa represents the ratio of the transmit power of a broadcast signal to a predetermined maximum power in the spatial division multiplexing stream transmission; and h(k) represents a column vector consisting of the n-th column of H(k). The column vector consists of the same number of elements as the number Nr(k) of antennas contained in the reception unit of terminal 2-$k$ when the broadcast signal is transmitted from the n-th antenna.

$$SNR_t(k) = \frac{|H(k)W_n(k)|^2}{P_a h^H(k) h(k)} \qquad \text{Equation 18}$$

The following process is performed in wireless base station device 1 on the assumption that wireless base station device 1 has a table showing the relationship between reception quality (SNR) and the optimum MCS in terminals 2. First, power distribution to terminals 2 is performed in descending order of data transmission priority from all terminals 2 to be concurrently connected according to each allowable delay required as a part of QoS. Then, a required SNR to satisfy the minimum transmission rate is determined, after a predetermined margin is added, from the MCS combinations that achieve the transmission rate satisfying the allowable delay.

Then, power distribution factor b(j) is determined in such a manner that SNRt(j), which is the SNR in the spatial division multiplexing stream transmission, can be nearly equal to the required SNR. When b(j) is smaller than 1, power is uniformly distributed within the surplus transmit power to the other spatial streams or to the other terminals 2 to be concurrently connected, and no transmission is made to terminals 2 that do not satisfy the required SNR. Eventually, the power distribution is performed so that the total of power distribution factors b(k) is 1 or less.

The operation of transmission signal generation sections 3-1 to 3-$s$ is described in detail as follows. First, first to s-th transmission signal generation sections 3-1 to 3-$s$ generate signals (hereinafter, transmission data sequences) to be transmitted to terminals 2-1 to 2-s connected by spatial division multiplexing (preferably allocated). Each transmission data sequence is error-correction encoded by an unillustrated error correction encoder, interleaved by an unillustrated interleaver, punctured by an unillustrated puncturer, and symbol mapped by an unillustrated modulator in accordance with a predetermined modulation system. Hereinafter, the symbol mapped signal is referred to as a symbol data sequence or a spatial stream individual data signal. After this, each symbol data sequence is provided with a known pilot signal and control information so as to generate a transmission signal having a predetermined frame structure. Hereinafter, the transmission signal is referred to as a transmission data frame sequence.

Figure 9A:
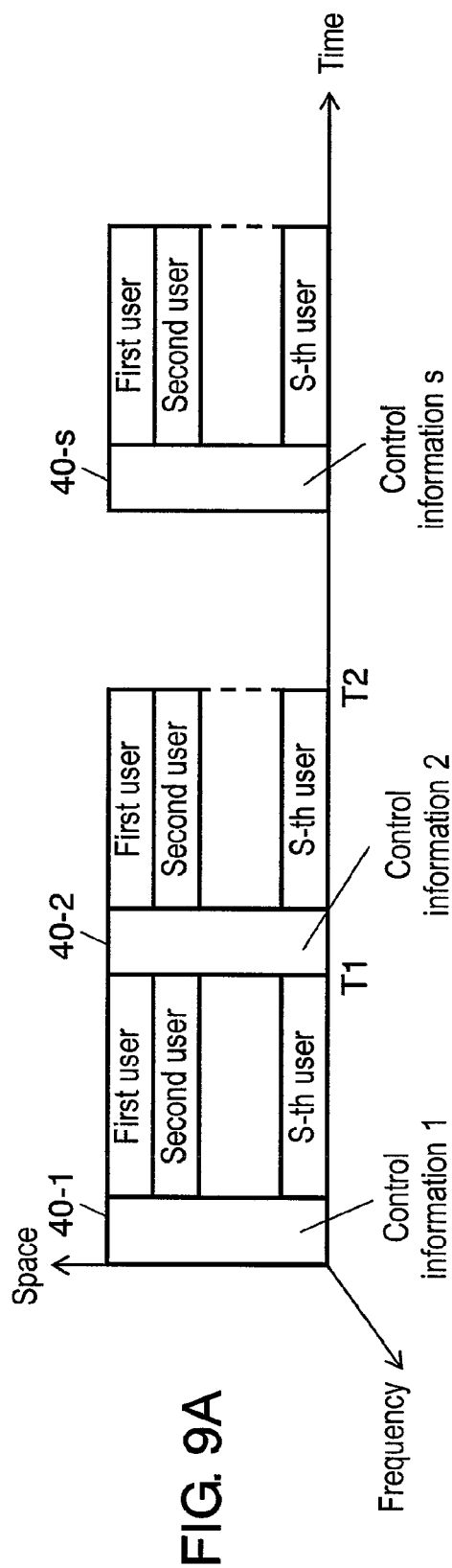
FIG. 9A is a diagram showing the spatial division multiplexing transmission of a first transmission data frame sequence along the temporal and spatial axes according to the first embodiment of the present invention.
Figure 9B:
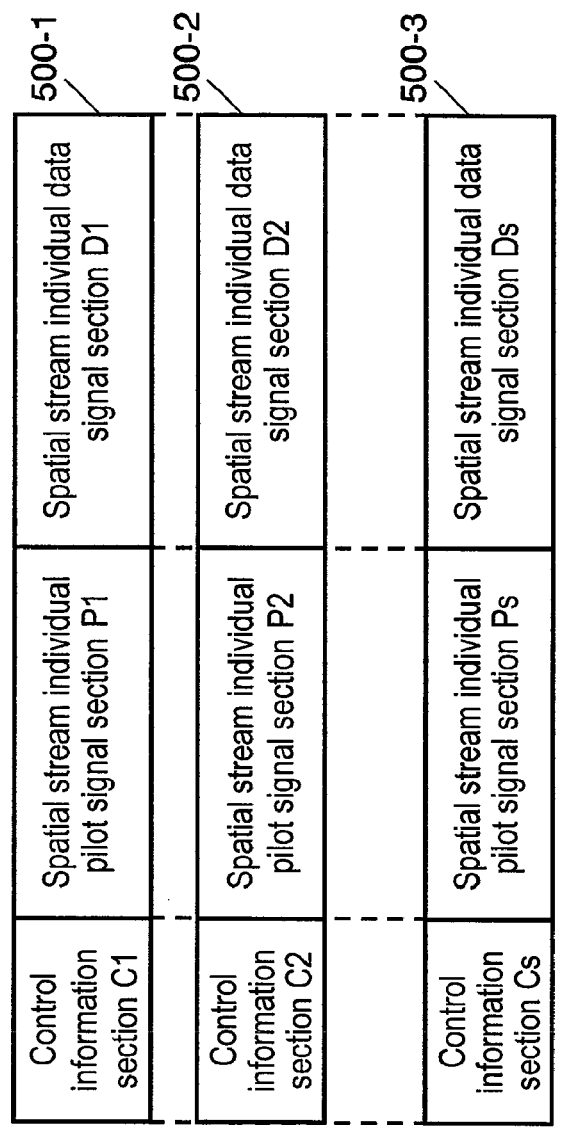
FIG. 9B is a diagram showing a structure of the first transmission data frame sequence according to the first embodiment of the present invention.

FIG. 9B shows a structure of a transmission data frame sequence. Transmission data frame sequences 500-1 to 500-s generated and outputted respectively by first to s-th transmission signal generation sections 3-1 to 3-s consist of control information sections C1 to Cs, respectively, and spatial stream sections K1 to Ks, respectively. Spatial stream sections K1 to Ks consist of spatial stream individual pilot signal sections P1 to Ps, respectively, and spatial stream individual data signal sections D1 to Ds, respectively.

Control information sections C1 to Cs, which are signals to be broadcast to all terminals 2-1 to 2-s to be connected by spatial division multiplexing, are transmitted omnidirectionally. Control information sections C1 to Cs contain the number of spatial streams following thereto; the ID information of the designation terminals corresponding to spatial stream numbers, that is, the information to associate each spatial stream with the transmission data sequence to be transmitted to each terminal; and modulation format information such as coding method, coding rate, modulation level, and data length.

On the other hand, spatial stream sections K1 to Ks, which are signals to be transmitted to terminals 2-1 to 2-s, respectively, using a transmit weight, are transmitted directionally. Spatial stream sections K1 to Ks have a preamble structure in which spatial stream individual pilot signal sections P1 to Ps each consisting of a known pilot signal sequence are added to the previous stage of the spatial stream individual data signal sections D1 to Ds containing the transmission data (individual data) to be transmitted to each terminal. The preamble structure may be replaced by a postamble structure in which sections P1 to Ps are added to the subsequent stage of sections D1 to Ds, or a midamble structure in which sections P1 to Ps are added in the middle of sections D1 to Ds.

FIG. 9A is a schematic diagram showing the spatial division multiplexing transmission of the aforementioned transmission data frame sequences to terminals 2-1 to 2-s (corresponding to the first to s-th users) along the temporal and spatial axes. The diagram indicates that control information 40-1 to 40-s is transmitted omnidirectionally to all the users (the first to s-th users) to be connected by spatial division multiplexing, and then an individual signal is transmitted directionally to each of the users (the first to s-th users). The time from T1 to T2 corresponds to the time required to transmit a single transmission data frame sequence.

Figure 10A:
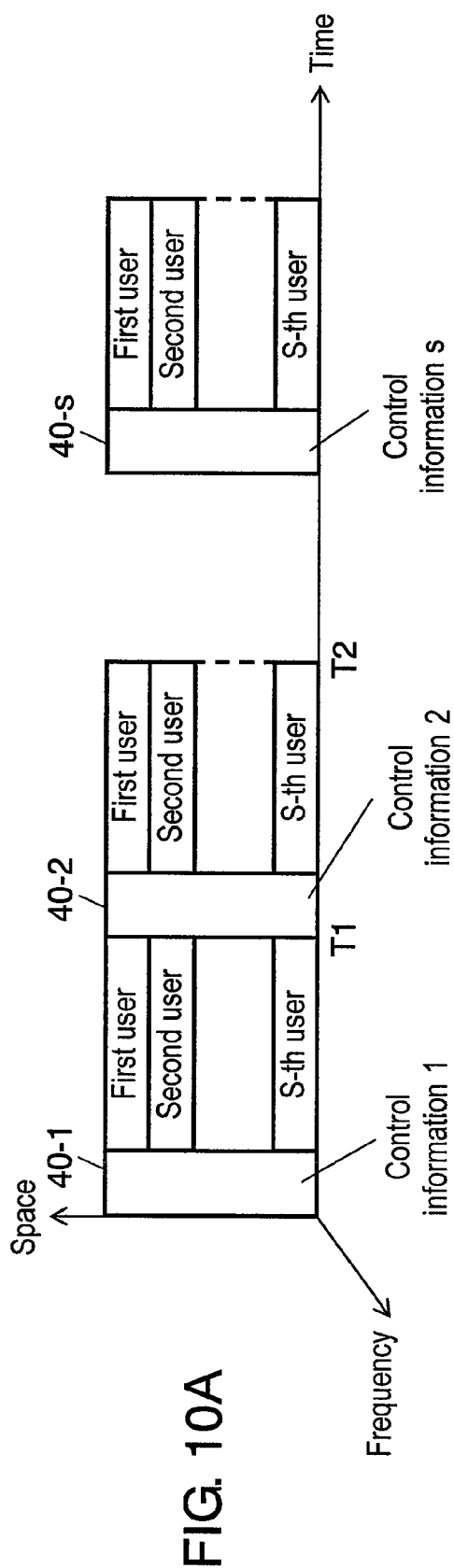
FIG. 10A is a diagram showing the spatial division multiplexing transmission of a second transmission data frame sequence along the temporal and spatial axes according to the first embodiment of the present invention.
Figure 10B:
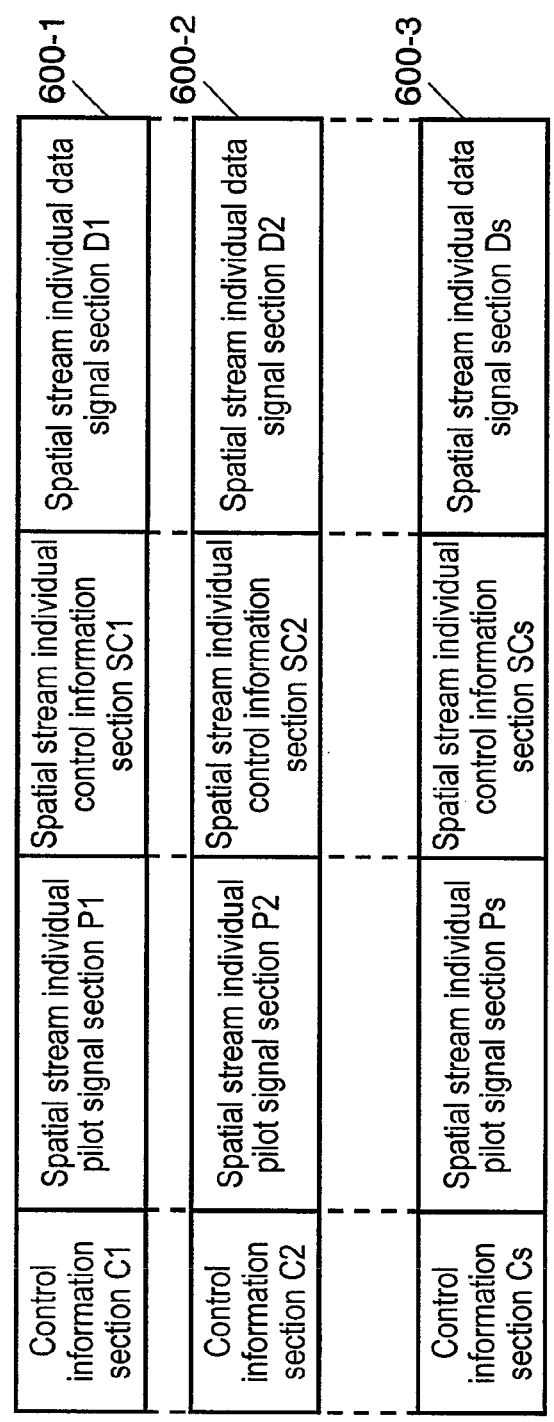
FIG. 10B is a diagram showing a structure of the second transmission data frame sequence according to the first embodiment of the present invention.

FIG. 10B shows a structure of a second transmission data frame sequence. Unlike the frame structure of FIG. 9B, the spatial stream sections include spatial stream individual control information sections SC1 to SCs. Spatial stream individual control information sections SC1 to SCs include the modulation format information of the subsequent spatial stream individual data signal sections D1 to Ds. The modulation format information is transmitted by a fixed predetermined modulation format.

Using this structure makes it unnecessary for control information sections C1 to Cs to contain the modulation format information of the subsequent spatial stream individual data signal sections D1 to Ds, thereby reducing the amount of data in control information sections C1 to Cs. Furthermore, spatial stream individual control information sections SC1 to SCs containing the modulation format information of spatial stream individual data signal sections D1 to Ds are also transmitted directionally. This prevents terminals 2-1 to 2-s from erroneously receiving the modulation format information of spatial stream individual data signal sections D1 to Ds. This ensures improved reception quality.

Such is the detailed description of items [1] to [3].

The operation of terminals 2-1 to 2-s to receive spatially-multiplexed transmitted signals from wireless base station device 1 is described as follows with reference to FIGS. 2A and 2B. The following is a description of the operation after (frame and symbol) synchronization is established with wireless base station device 1.

First, in terminal 2-A, radio frequency signals received by receiving unit antennas 20-1 to 20-m are inputted to reception sections 221-1 to 221-m. Reception sections 221-1 to 221-m filter a predetermined band from the radio frequency signals; frequency-convert the radio frequency signals into quadrature-detected baseband signals; and output digital signal data (hereinafter, complex baseband signals) consisting of I signals and Q signals through a digital-analog converter (hereinafter, A/D converter).

Spatial division demultiplexing section 223 receives the data signal having a predetermined spatial stream number notified to its own terminal from the received one or more complex baseband signals. Then, spatial division demultiplexing section 223 either eliminates the other data signals having the spatial stream numbers other than it own terminal, that is, interference signals, or reduces it to a level that can ensure signal quality sufficient for transmission. To achieve this, spatial division demultiplexing section 223 operates as follows.

First, in channel estimation section 222, all of the spatial stream individual pilot signals are separated and extracted from the spatial streams at the arrival timing of pilot signals that are transmitted attached to the respective spatial streams (hereinafter, spatial stream individual pilot signals), thereby calculating the channel estimation values of the propagation paths. M-th terminal 2-m, which receives a spatially multiplexed signal, includes Nr(m) receiving unit antennas 20-1 to 20-m and Nr(m) reception sections 221-1 to 221-m corresponding thereto, respectively.

When the k-th spatial stream individual pilot signal sequence (Equation 19) is received by j-th receiving unit antenna 20-j and reception section 221-j of m-th terminal 2-m, the output signal (Equation 20) is obtained. When a correlation calculation is performed between the output signal and Equation 19 generated in terminal 2-m as shown in Equation 21, a channel estimation value (Equation 22) of a propagation path can be determined.

$$AP_k(t) \qquad \text{Equation 19}$$

$$r_{j,k}^{(m)}(t) \qquad \text{Equation 20}$$

where j=1, . . . , Nr(m); k=1, . . . , Ns; and Nr(m) is the number of receiving unit antennas.

$$h^m(j,k) = \sum_{t=1}^{N_p} AP_k^*(t) r_{j,k}^{(m)}(t) \qquad \text{Equation 21}$$

where Np is the number of symbols of spatial stream individual pilot signal sequences, and the superscript asterisk "*" indicates an operator to perform complex conjugate multiplication.

$$h^m(j,k) \qquad \text{Equation 22}$$

It is possible to store the results of a plurality of times of reception of spatial stream individual pilot signal sequences (Equation 19) and to perform averaging. In that case, if the travel speed of terminal 2-*m* is low enough, this can reduce noise influence and increase the channel estimation quality of the propagation path.

Finally, channel estimation values (Equation 22) of a total of Ns×Nr(m) propagation paths are calculated as the channel estimation values of the propagation paths of m-th terminal 2-*m* where Ns represents the number of spatial division multiplexing streams and Nr(m) represents the number of receiving unit antennas of terminal 2-*m*.

The channel estimation matrix (Equation 23) on terminal 2-*m* is defined by Equation 24.

$$H^m \qquad \text{Equation 23}$$

$$H^m = \begin{bmatrix} h^m(1,1) & h^m(1,2) & \ldots & h^m(1,N_t) \\ h^m(2,1) & h^m(2,2) & \ldots & h^m(2,N_t) \\ \vdots & \vdots & \vdots & \vdots \\ h^m(N_s^{(m)},1) & h^m(N_s^{(m)},2) & \ldots & h^m(N_s^{(m)},N_t) \end{bmatrix} \qquad \text{Equation 24}$$

Then, spatial multiplexed channels are separated using the obtained channel estimation matrix (Equation 23). The separation of spatial multiplexed channels involves the same operations as the separation and extraction of the data signal from each spatial division multiplexing stream.

The algorithm used for the separation can be, for example, ZF (Zero Forcing) using the inverse matrix of the channel estimation matrix, or MMSE (Minimum Mean Square Error).

When ZF algorithm is applied to a reception signal (Equation 25) of j-th receiving unit antenna 20-*j* and reception section 221-*j* in m-th terminal 2-*m*, row vector V(Bm) consisting of the (Bm)-th row in $(H^m)^{-1}$, which is the inverse matrix of Hm, is calculated. Row vector V(Bm) is regarded as the reception weight used to receive a predetermined spatial division multiplexing stream.

$$r_j^{(m)}(t) \qquad \text{Equation 25}$$

where j=1, ..., Nr(m); and Nr(m) is the number of receiving unit antennas.

Bm represents a spatial stream number to be transmitted to terminal 2-*m* notified from wireless base station device 1. The data signal having the Bm-th spatial stream number can be extracted as a desired signal as follows: Reception weight V(Bm) is multiplied by a spatial stream receiving signal in terminal 2-*m* (Equation 27) as shown in Equation 26 so as to suppress the interference signals from the other spatial streams.

$$z_{B_m}^m(t) = V(B_m) r^m(t) \qquad \text{Equation 26}$$

$$r^{(m)}(t) \qquad \text{Equation 27}$$

where $r^{(m)}(t)$ is a column vector having $rj^{(m)}(t)$ where j=1, ..., Nr(m) as the j-th element. The j-th element $rj^{(m)}(t)$ is received by the j-th antenna and reception section 221-*j* in m-th terminal 2-*m*.

Next, the case of using MMSE algorithm is described. In the same manner as in ZF algorithm, row vector V(Bm) consisting of the Bm-th row of reception weight matrix W calculated according to the MMSE standard is determined. Then, row vector V(Bm) is regarded as the reception weight used to receive a predetermined spatial stream.

The Bm-th spatial stream can be received as a desired signal by multiplying the reception weight by the spatial stream receiving signal (Equation 27) in terminal 2-*m* as shown in Equation 26 so as to suppress the interference signal components from the other spatial streams.

When there are a plurality of spatial stream numbers to be transmitted to the same terminal 2-*m*, reception weights used to receive the data signals having these spatial stream numbers are generated and multiplied by the spatial stream receiving signal (Equation 27). As a result, a desired signal can be received after being separated from each spatial stream.

When information about the modulation and coding such as the coding rate and the modulation level of the spatial stream data to be transmitted to the terminals other than terminal 2-*m* is known, it is possible to use maximum likelihood estimation (connection estimation), successive (or serial)-interference-canceller (for example, V-BLAST) or other algorithms.

Demodulation section 224 performs demodulation and decoding of a desired signal received after being separated from the spatial division multiplexing stream, thereby restoring a predetermined transmission data sequence.

Terminal 2-B having only one receiving unit antenna 20-1 as shown in FIG. 2B cannot eliminate spatial interference due to the absence of spatial division demultiplexing section 223. Therefore, demodulation section 224 performs demodulation while compensating the influence due to environmental changes of the propagation path. The demodulation is performed using the channel estimation value obtained by channel estimation section 222 from the signal received by reception section 221-1.

As described above, in the present first embodiment, it is possible to select a transmit weight that can improve the spatial division multiplexing transmission with terminals 2-1 to 2-*s* in accordance with various spatial correlation conditions and also improve the reception quality of terminals 2-1 to 2-*s* each having a plurality of antennas. As a result, system capacity can be increased by spatial division multiplexing transmission.

Furthermore, in the process to allocate terminals 2 to be preferentially connected by spatial division multiplexing, it is unnecessary to perform the control of combination allocation of terminals 2 based on the detection of the spatial correlation coefficient, which is conventionally performed by the wireless base station device, and it is only necessary to perform preferential user allocation process by a packet scheduler. This simplifies the scheduling process for terminals 2 to be connected by spatial division multiplexing.

When terminal 2 has a plurality of receiving unit antennas as in terminal 2-A, wireless base station device 1 transmits known pilot signals by being associated with the corresponding spatial streams, and reception unit 220 of terminal 2 performs channel estimation using the pilot signals. Consequently, when transmit weights are generated by wireless base station device 1, even if there is a channel estimation error or an environmental change in the propagation path, that is, a temporal change in the channel, deterioration of communication quality due to the changes can be reduced.

In the case of the TDD system, using the feature of "reciprocity in a propagation path" allows the use of the channel estimation result of the uplink as the channel estimation value of the downlink. In that case, it is necessary to fully correct the deviation between the transmission-reception system of the uplink and the transmission-reception system of the downlink including an antenna for transmission and reception and a radio frequency (RF) circuit. However, the correction is generally insufficient, so that in many cases there is an error between the systems. Therefore, the present algorithm, MMSE, can be applied to reduce the deterioration of communication quality due to the influence of the error between the systems.

In the present first embodiment, after transmit weight generation sections 6-1 to 6-*n* generate respective transmit weights, beam selection section 7 selects a transmit weight based on the predicted SINR. Alternatively, however, it is possible to calculate the spatial correlation coefficient between the terminals, and then to determine the transmit weight based on an average value or a minimum value.

In this case, a transmit weight generation algorithm that is optimum for the spatial correlation conditions between the terminals is selected quicker than the convention method based on the following fact. There is a specific relationship between three basically different algorithms for transmit weight generation about the spatial correlation coefficient-to-communication quality characteristics. The characteristics are divided into a plurality of regions according to the specific relationship, and an algorithm providing the best communication quality is selected in each of the regions automatically from among the three algorithms.

More specifically, the transmit weight can be easily selected through the following two steps: A step of extracting channel information between the terminals and the wireless base station device from the reception signals received from the terminals, thereby determining a spatial correlation coefficient between the terminals with which the wireless base station device performs spatial division multiplexing transmission based on the channel information. The other step of previously determining a method for selecting an algorithm providing the best communication quality in each region from among the three transmit weight generation algorithms, and selecting the algorithm providing the best communication quality based on this selection method and on the spatial correlation coefficient determined by the former step.

In the present first embodiment, both single-carrier transmission and multicarrier transmission can be achieved. Multicarrier transmission can be achieved by calculating a channel estimation value for every subcarrier and performing the separate reception of spatial division multiplexing streams for every subcarrier as done in the present embodiment. Multicarrier transmission can be applied regardless of the duplex mode such as TDD or FDD, and the access mode such as TDMA, FDMA, or CDMA.

As described hereinbefore, according to the present first embodiment, there is provided transmit weight determination section 5. Transmit weight determination section 5 can change the algorithm to generate transmit weights which are used for wireless base station device 1 to perform spatial division multiplexing transmission with terminals 2-1 to 2-*s* based on the channel information. The presence of transmit weight determination section 5 can improve and ensure the communication quality under various spatial correlation conditions and hence can increase system capacity by spatial division multiplexing transmission.

The presence of transmit weight determination section 5 can also change the transmit weight generation algorithm depending on the spatial correlation conditions between the terminals so as to achieve spatial division multiplexing transmission robust to the spatial correlation conditions between the terminals. This simplifies the conventional allocation process based on the spatial correlation coefficient. As a result, wireless base station device 1 can be simplified and the processing time required to control the spatial division multiplexing transmission can be reduced.

Wireless base station device 1 may have the function of performing spatial division multiplexing transmission using the following components: transmit weight generation sections 6-1 to 6-*n*; beam selection section 7; and transmit beam formation section 9. Transmit weight generation sections 6-1 to 6-*n* generate pieces of transmit weight information according to different algorithms. The sets of transmit weight information are used to form transmit beams to be transmitted to terminals 2-1 to 2-*s* with which wireless base station device 1 performs spatial division multiplexing transmission based on the channel information on terminals 2-1 to 2-*s*. Beam selection section 7 selects one of pieces of transmit weight information generated according to the different algorithms. Transmit beam formation section 9 forms the transmit beams using the selected transmit weight information as the transmit weight. As a result, it becomes possible to improve and ensure the communication quality under various spatial correlation conditions and hence to increase system capacity by the spatial division multiplexing transmission.

It is also possible to select a transmit weight generation algorithm that is optimum to the spatial correlation conditions between the terminals. This achieves spatial division multiplexing transmission robust to the spatial correlation conditions between the terminals, thereby simplifying the conventional allocation process based on the spatial correlation coefficient. As a result, wireless base station device 1 can be simplified and the processing time required to control the spatial division multiplexing transmission can be reduced.

Transmit power determination section 8 may have the function of determining transmit powers for the spatial division multiplexing signals to be transmitted to terminals 2-1 to 2-*s* based on the selected transmit weight information. This allows to select an optimum one of the different transmit weight generation algorithms and to generate a transmit weight that is optimum for the spatial correlation conditions detected from the channel information according to the selected transmit weight generation algorithm at the time of spatial division multiplexing transmission to terminals 2-1 to 2-*s*. The structure also allows to control the powers required to transmit the signals using these transmit weights. This makes it possible to perform transmission using signal power to satisfy predetermined communication quality, that is, without using more than necessary transmit power, thereby reducing co-channel interference and increasing system capacity.

Beam selection section 7 may have the function of selecting transmit weight information to be used as a transmit weight, based on the information indicating the signal-to-interference-noise and power ratio of terminals 2. As a result, it becomes possible to improve and ensure the communication quality under various spatial correlation conditions and hence to increase system capacity by the spatial division multiplexing transmission.

Beam selection section 7 can also have the function of selecting a transmit weight by using a predicted reception weight of terminal 2 when terminal 2 has a plurality of receiving unit antennas 20-1 to 20-*m*. The predicted reception weight represents a prediction of a reception weight of terminal 2. As a result, it becomes possible to improve and ensure the communication quality under various spatial correlation conditions and hence to increase system capacity by the spatial division multiplexing transmission.

The predicted reception weight may be a weight used to form a maximum ratio combining reception beam. This allows to improve and ensure the communication quality under various spatial correlation conditions and hence to increase system capacity by the spatial division multiplexing transmission.

The predicted reception weight can be a left singular vector obtained by performing a singular value decomposition of a channel estimation matrix. As a result, the transmit weight that maximizes the received power can be determined while suppressing the co-channel interference. This allows to improve and ensure the communication quality under various spatial correlation conditions and hence to increase system capacity by the spatial division multiplexing transmission.

The predicted reception weight may be a weight used to form a minimum-mean-square-error beam. This allows to select a transmit weight from among those generated according to the different transmit weight generation algorithms. The transmit weight is optimum for the spatial correlation conditions detected from the channel information at the time of spatial division multiplexing transmission to terminals 2-1 to 2-s. The selection of the optimum transmit weight can be performed by predicting the reception quality when terminals 2 each having receiving unit antennas 20-1 to 20-m use left singular vectors obtained by performing a singular value decomposition of a channel estimation matrix.

As a result, the transmit weight information having the reception quality that maximizes the signal-to-noise power ratio can be selected from among the pieces of transmit weight information by utilizing the following fact. The reception quality that maximizes the signal-to-noise power ratio (SNR) can be obtained by using a left singular vector corresponding to the largest singular value among the left singular vectors obtained by performing a singular value decomposition of a channel estimation matrix.

This is effective especially in the case where the spatial correlation between the terminals to be concurrently connected is low so that there is little co-channel interference. The reception weight used in terminals 2 can be uniquely determined from a channel estimation matrix. When the number of spatial division multiplexing streams to be transmitted to terminal 2 is smaller than the number of receiving unit antennas of terminal 2, it is possible to select a transmit weight having a high transmit diversity which can reduce restrictions to reduce co-channel interference for the formation of the transmit weight. As a result, it is possible to improve and ensure the communication quality and hence to increase system capacity by the spatial division multiplexing transmission.

The predicted reception weight may be a weight used to form a zero forcing beam. This allows to select a transmit weight from among those generated according to the different transmit weight generation algorithms. The transmit weight is optimum for the spatial correlation conditions detected from the channel information at the time of spatial division multiplexing transmission to terminals 2-1 to 2-s. The selection of the optimum transmit weight can be performed by predicting the reception quality when terminals 2 each having receiving unit antennas 20-1 to 20-m use a minimum-mean-square-error (MMSE) beam.

As a result, the reception quality that maximizes the signal-to-interference and noise power ratio (SINR) can be obtained by allowing terminals 2 to use a weight used to form a minimum-mean-square-error (MMSE) beam. This feature can be used to select the transmit weight information having the reception quality that maximizes the signal-to-interference and noise power ratio from among the pieces of transmit weight information. As a result, it becomes possible to improve and ensure the communication quality under various spatial correlation conditions in the environment where co-channel interference exists and hence to increase system capacity by the spatial division multiplexing transmission.

Transmit power determination section 8 may have the function of determining the transmit powers for the spatial division multiplexing signals to be transmitted to terminals 2-1 to 2-s based on the selected transmit weight information. This allows to select a transmit weight from among those generated according to the different transmit weight generation algorithms. The transmit weight is optimum for the spatial correlation conditions detected from the channel information at the time of spatial division multiplexing transmission to terminals 2-1 to 2-s. The selection of the optimum transmit weight can be performed by predicting the reception quality when terminals 2 each having receiving unit antennas 20-1 to 20-m use a zero forcing (ZF) beam.

Furthermore, allowing terminals 2 to use the weight used to form a zero forcing (ZF) beam can obtain the reception quality to form the reception weight under a restriction to give preference to reduce the interference and noise power of the co-channel. This feature can be used to select the transmit weight information having the reception quality that maximizes the signal-to-interference and noise power ratio from among the pieces of transmit weight information. As a result, the transmit weight that maximizes the received power can be determined while suppressing the co-channel interference. This allows to improve and ensure the communication quality under various spatial correlation conditions and hence to increase system capacity by the spatial division multiplexing transmission. In addition, the ZF beam, which can be calculated in a smaller calculation amount than the MMSE beam, can reduce circuit size and the cost of the terminals.

Wireless base station device 1 may have the function of performing spatial division multiplexing transmission using transmit weight generation sections 6-1 to 6-n; beam selection section 7 and selected transmit weight information as the transmit weight. Transmit weight generation sections 6-1 to 6-n generate pieces of transmit weight information according to different algorithms. The sets of transmit weight information are used for wireless base station device 1 to perform spatial division multiplexing transmission with terminals 2-1 to 2-s having one or more receiving unit antennas based on the channel information on terminals 2-1 to 2-s. Beam selection section 7 selects a transmit weight generation section 6 having a previously specified algorithm, based on the channel information. Transmit beam formation section 9 forms the transmit beams using the selected transmit weight information as the transmit weight. As a result, it becomes possible to improve and ensure the communication quality under various spatial correlation conditions and hence to increase system capacity by the spatial division multiplexing transmission.

One of transmit weight generation sections 6-1 to 6-n may have the function of generating transmit weight information used to form eigenvector beams to be transmitted to terminals 2. This allows to use a transmit weight which can improve the reception quality of a predetermined terminal 2 at the time of spatial division multiplexing transmission to terminals 2-1 to 2-s without a restriction to reduce the interference to other terminals 2. The transmit weight is used particularly when the channel correlation between the terminals is low, depending on various spatial correlation conditions detected from the channel information.

One of transmit weight generation sections 6-1 to 6-n may have the function of generating transmit weight information which causes little or no interference to terminals 2 other than a predetermined terminal 2. This allows to use a transmit weight which can improve the reception quality of a predetermined terminal 2 at the time of spatial division multiplexing transmission to terminals 2-1 to 2-s with a restriction to minimize the interference to other terminals 2. The transmit weight is used particularly when the channel correlation between the terminals is comparatively high, depending on various spatial correlation conditions detected from the channel information.

One of transmit weight generation sections 6-1 to 6-n may have the function of generating transmit weight information which causes little or no interference to terminals 2 other than a predetermined terminal 2 on the assumption that the predetermined terminal 2 performs reception using maximum ratio combining. This allows reducing the number of restrictions to minimize the interference to terminals 2 other than a predetermined terminal 2 at the time of spatial division multiplexing transmission to terminals 2-1 to 2-s. The number of restrictions can be reduced when the channel correlation between the terminals is comparatively high and the other terminals 2 each have a plurality of receiving unit antennas 20-1 to 20-m, depending on various spatial correlation conditions detected from the channel information. This makes it possible to use a transmit weight which can improve the reception quality to a predetermined terminal 2.

One of transmit weight generation sections 6-1 to 6-n may have the function of generating transmit weight information used to form a transmit weight vector whose components are all zero. This allows to use a transmit weight which does not perform transmission to other terminals 2 at the time of spatial division multiplexing transmission to terminals 2-1 to 2-s. The transmit weight can be used particularly when the channel correlation between the terminals is high depending on various spatial correlation conditions detected from the channel information.

One of transmit weight generation sections 6-1 to 6-n may have the function of generating transmit weight information used to form a previously fixed transmit weight vector. This allows to selectively vary the previously fixed transmit weight at the time of spatial division multiplexing transmission to terminals 2-1 to 2-s, depending on various spatial correlation conditions detected from the channel information. As a result, it becomes possible to improve and ensure the communication quality under various spatial correlation conditions and hence to increase system capacity by the spatial division multiplexing transmission.

Wireless base station device 1 may have the function of performing spatial division multiplexing transmission by inserting a known signal sequence into each spatial division multiplexing transmitted signal while using a transmit weight vector formed from the selected transmit weight information data. This allows to selectively vary the transmit weight generation algorithm at the time of spatial division multiplexing transmission to terminals 2-1 to 2-s, depending on various spatial correlation conditions detected from the channel information. This also allows terminal 2 to separately receive a spatially multiplexed signal using the known signal sequence inserted into each transmitted signal, even when the channel information includes an error. As a result, it becomes possible to improve and ensure the communication quality under various spatial correlation conditions and hence to increase system capacity by the spatial division multiplexing transmission.

Terminals 2 may have the function of generating a reception weight, which is used to perform channel estimation, to separate a desired signal from the spatial division multiplexing signal, and to output it based on the known signal sequence provided to each spatially-multiplexed transmitted signal. This allows terminal 2 to separately receive a spatially multiplexed signal at the time of spatial division multiplexing transmission to terminals 2-1 to 2-s, using a known signal sequence provided to each transmission signal.

Consequently, when wireless base station device 1 generates a transmit weight based on the channel information containing an error, terminals 2 can separately receive a spatially multiplexed signal using a known signal sequence provided to each transmission signal. As a result, it becomes possible to improve and ensure the communication quality under various spatial correlation conditions and hence to increase system capacity by the spatial division multiplexing transmission.

Channel estimation section 222 and spatial division demultiplexing section 223 may have the function of generating a maximum ratio combining reception weight as a reception weight, based on the value obtained by channel estimation in channel estimation section 222. This allows terminal 2 to separately receive a spatially multiplexed signal at the time of spatial division multiplexing transmission to terminals 2-1 to 2-s, using a known signal sequence provided to each transmission signal.

Consequently, when wireless base station device 1 generates a transmit weight based on the channel information containing an error, terminals 2 can separately receive a spatially multiplexed signal in such a manner as to have the highest received power using a known signal sequence provided to each transmission signal. As a result, it becomes possible to improve and ensure the communication quality under various spatial correlation conditions and hence to increase system capacity by the spatial division multiplexing transmission.

Channel estimation section 222 and spatial division demultiplexing section 223 may have the function of generating a minimum-mean-square-error weight as a reception weight based on the value obtained by channel estimation in channel estimation section 222. This allows terminal 2 to separately receive a spatially multiplexed signal at the time of spatial division multiplexing transmission to terminals 2-1 to 2-s, using a known signal sequence provided to each transmission signal.

Consequently, when wireless base station device 1 generates a transmit weight based on the channel information containing an error, terminals 2 can separately receive a spatially multiplexed signal in such a manner that the desired signal has the highest desired-signal-received-power-to-interference-and-Noise-power ratio, using a known signal sequence provided to each transmission signal. As a result, it becomes possible to improve and ensure the communication quality under various spatial correlation conditions and hence to increase system capacity by the spatial division multiplexing transmission.

Channel estimation section 222 and spatial division demultiplexing section 223 may have the function of generating a left singular vector corresponding to a maximum singular value as a reception weight. The maximum singular value is obtained by performing a singular value decomposition of a channel estimation matrix obtained by channel estimation based on a known signal sequence inserted into each spatially-multiplexed transmitted signal. The reception weight is used to separate a desired signal from the spatial division multiplexing signal and to output it. This allows to terminal 2 to separately receive a spatially multiplexed signal using the known signal sequence inserted into each transmission signal on the terminal side at the time of spatial division multiplexing transmission to terminals 2-1 to 2-s.

Consequently, particularly when a transmit weight used to improve the reception quality of a predetermined terminal 2 is used with a restriction to minimize the interference to the other terminals 2, the co-channel interference to the other terminals 2 can be reduced and the received power of the spatially multiplexed signal component can be maximized. As a result, it becomes possible to improve and ensure the communication quality and hence to increase system capacity by the spatial division multiplexing transmission.

The wireless communication method of the present invention may have the following two steps. One step is to extract channel information between terminals 2 and wireless base station device 1 from the signals received from terminals 2, and to determine a spatial correlation coefficient between the terminals with which wireless base station device 1 performs spatial division multiplexing transmission, based on the extracted channel information.

The other step is to select one of the following first to third types that provides the best communication quality according to the spatial correlation coefficient obtained by the former step, based on a predetermined selection process. The first type generates transmit weights according to an algorithm to generate a transmit weight which improve the reception quality of a predetermined terminal with a restriction to minimize the interference to other terminals 2. The second type generates transmit weights according to an algorithm to generate a transmit weight which improves the reception quality of a predetermined terminal without a restriction to reduce the interference to other terminals 2. The third type generates a transmit weight according to an algorithm to generate a single transmit weight. The wireless communication method with these two steps can use a specific relationship existing between the three different algorithms for transmit weight generation about the spatial correlation coefficient-to-communication quality characteristics. The characteristics are divided into a plurality of regions according to the specific relationship, and it is designed that an algorithm providing the best communication quality is selected in each of the regions automatically from among the three algorithms. This eliminates the need to select an optimum type every time the spatial correlation coefficient is calculated, thereby selecting a transmit weight generation algorithm optimum for the spatial correlation conditions of the terminals. As a result, spatial division multiplexing transmission can be robust to the spatial correlation conditions between the terminals. This simplifies the allocation process of the terminals to be connected by spatial division multiplexing, thereby reducing processing time, and also increases system capacity by spatial division multiplexing transmission.

Second Embodiment

Figure 11:
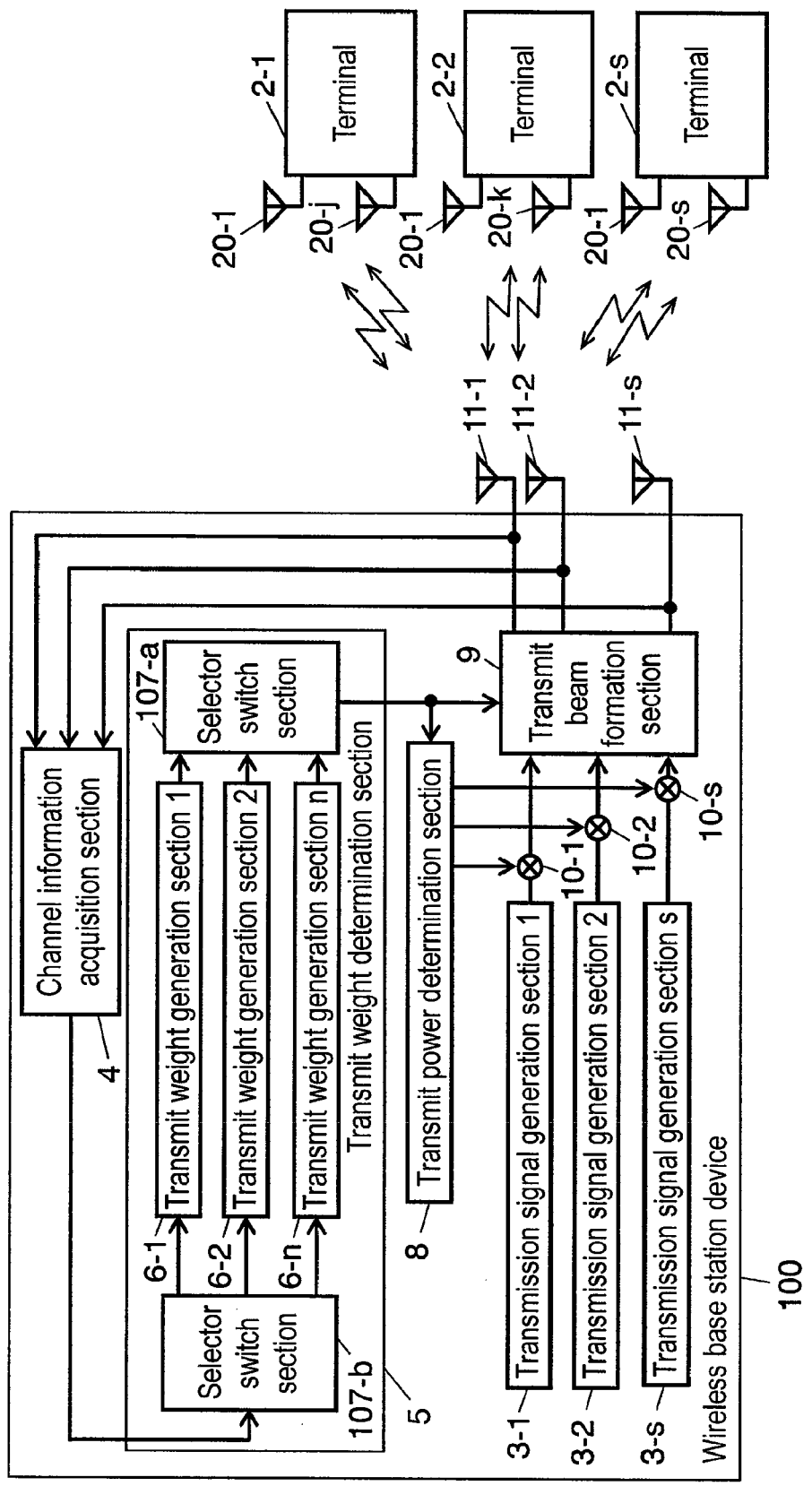
FIG. 11 is a diagram showing a wireless base station device and terminals according to a second embodiment of the present invention.

Wireless base station device 100 of a second embodiment of the present invention is shown in FIG. 11.

Wireless base station device 100 differs from wireless base station device 1 of the first embodiment in that there is provided selector switch section 107-a instead of beam selection section 7 and there is further provided selector switch section 107-b between channel information acquisition section 4 and transmit weight generation sections 6-1 to 6-n. From a functional point of view, device 100 differs from device 1 in that channel information acquisition section 4 has not only the conventional function of extracting channel information but also the function of controlling selector switch sections so as to select the optimum transmit weight generation section 6 based on the extracted channel information.

On the other hand, selector switch sections 107-a and 107-b are associated with each other. For example, when selector switch section 107-b selects transmit weight generation section 6-1, selector switch section 107-a is connected to the output side of transmit weight generation section 6-1. Selector switch section 107-b is further associated with the operation switches of the transmit weight generation sections 6. As soon as transmit weight generation sections 6 connected thereto are powered on, selector switch section 107-b receives channel information. This operation extracts channel information, selects the optimum transmit weight generation section 6, and obtains transmit weight information outputted therefrom.

This allows operating only the selected transmit weight generation section 6 so that wireless base station device 100 can have a reduced power consumption in addition to the advantage of the first embodiment of the present invention. Furthermore, in the case where the transmit weights in transmit weight generation sections 6 are calculated using the common CPU, the selected transmit weight generation section 6 occupies the CPU, thereby improving arithmetic processing capability. This improves the throughput of the total system.

As described hereinbefore, in the present second embodiment, selector switch sections 107-a and 107-b are provided on both sides of transmit weight generation sections 6-1 to 6-n. Selector switch sections 107-a and 107-b select an arbitrary one of transmit weight generation sections 6-1 to 6-n which generate transmit weights used to perform spatial division multiplexing transmission with terminals 2-1 to 2-s with which wireless base station device 100 performs spatial division multiplexing transmission, based on the channel information on terminals 2-1 to 2-s. As a result, it becomes possible to improve and ensure the communication quality under various spatial correlation conditions and hence to increase system capacity by the spatial division multiplexing transmission.

It is also possible to select a transmit weight generation algorithm that is optimum to the spatial correlation conditions between the terminals. This achieves spatial division multiplexing transmission robust to the spatial correlation conditions between the terminals, thereby simplifying the conventional allocation process based on the spatial correlation coefficient. Furthermore, wireless base station device 100 can have a reduced power consumption, and the arithmetic processing capability can be improved, thereby improving the throughput of the total system. In addition, wireless base station device 100 can be simplified and the processing time required to control the spatial division multiplexing transmission can be reduced.

Transmit power determination section 8 may have the function of determining the transmit powers of the spatial division multiplexing signals to be transmitted to terminals 2-1 to 2-s based on the selected transmit weight information. This allows to select an optimum one of the different transmit weight generation algorithms and to generate a transmit weight that is optimum for the spatial correlation conditions detected from the channel information according to the selected transmit weight generation algorithm at the time of spatial division multiplexing transmission to terminals 2-1 to 2-s. The structure also allows to control the powers required to transmit signals using these transmit weights.

This makes it possible to perform transmission using signal power to satisfy predetermined communication quality, that is, without using more than necessary transmit power, thereby reducing co-channel interference and increasing system capacity.

One of transmit weight generation sections 6-1 to 6-$n$ may have the function of generating transmit weight information used to form eigenvector beams to be transmitted to terminals 2-1 to 2-$s$. This allows to use a transmit weight which can improve the reception quality of a predetermined terminal 2 at the time of spatial division multiplexing transmission to terminals 2-1 to 2-$s$ without a restriction to reduce the interference to other terminals 2. The transmit weight can be used particularly when the channel correlation between the terminals is low, depending on various spatial correlation conditions detected from the channel information.

One of transmit weight generation sections 6-1 to 6-$n$ may have the function of generating transmit weight information which causes little or no interference to terminals 2 other than a predetermined terminal 2. This allows to use a transmit weight which can improve the reception quality of a predetermined terminal 2 at the time of spatial division multiplexing transmission to terminals 2-1 to 2-$s$ with a restriction to minimize the interference to other terminals 2. The transmit weight can be used particularly when the channel correlation between the terminals is comparatively high, depending on various spatial correlation conditions detected from the channel information.

One of transmit weight generation sections 6-1 to 6-$n$ may have the function of generating transmit weight information which causes little or no interference to terminals 2 other than a predetermined terminal 2 on the assumption that the predetermined terminal 2 performs reception using maximum ratio combining. This allows to reduce the number of restrictions to minimize the interference to terminals 2 other than a predetermined terminal 2 at the time of spatial division multiplexing transmission to terminals 2-1 to 2-$s$, when the channel correlation between the terminals is comparatively high and the other terminals 2 each have a plurality of receiving unit antennas 20-1 to 20-$m$, depending on various spatial correlation conditions detected from the channel information. This makes it possible to use a transmit weight which can improve the reception quality to a predetermined terminal 2.

One of transmit weight generation sections 6-1 to 6-$n$ may have the function of generating transmit weight information used to form a transmit weight vector whose components are all zero. This allows to use a transmit weight which does not perform transmission to other terminals 2 at the time of spatial division multiplexing transmission to terminals 2-1 to 2-$s$. The transmit weight can be used particularly when the channel correlation between the terminals is high depending on various spatial correlation conditions detected from the channel information.

One of transmit weight generation sections 6-1 to 6-$n$ may have the function of generating transmit weight information used to form a previously fixed transmit weight vector. This allows to selectively vary the previously fixed transmit weight at the time of spatial division multiplexing transmission to terminals 2-1 to 2-$s$, depending on various spatial correlation conditions detected from the channel information. As a result, it becomes possible to improve and ensure the communication quality under various spatial correlation conditions and hence to increase system capacity by the spatial division multiplexing transmission.

Wireless base station device 100 may have the function of performing spatial division multiplexing transmission by inserting a known signal sequence into each spatially-multiplexed transmitted signal while using a transmit weight vector formed from the selected transmit weight information data. This allows to selectively vary the transmit weight generation algorithm at the time of spatial division multiplexing transmission to terminals 2-1 to 2-$s$, depending on various spatial correlation conditions detected from the channel information. This also allows terminal 2 to separately receive a spatially multiplexed signal using the known signal sequence inserted into each transmission signal, even when the channel information includes an error. As a result, it becomes possible to improve and ensure the communication quality under various spatial correlation conditions and hence to increase system capacity by the spatial division multiplexing transmission.

Third Embodiment

Figure 12:
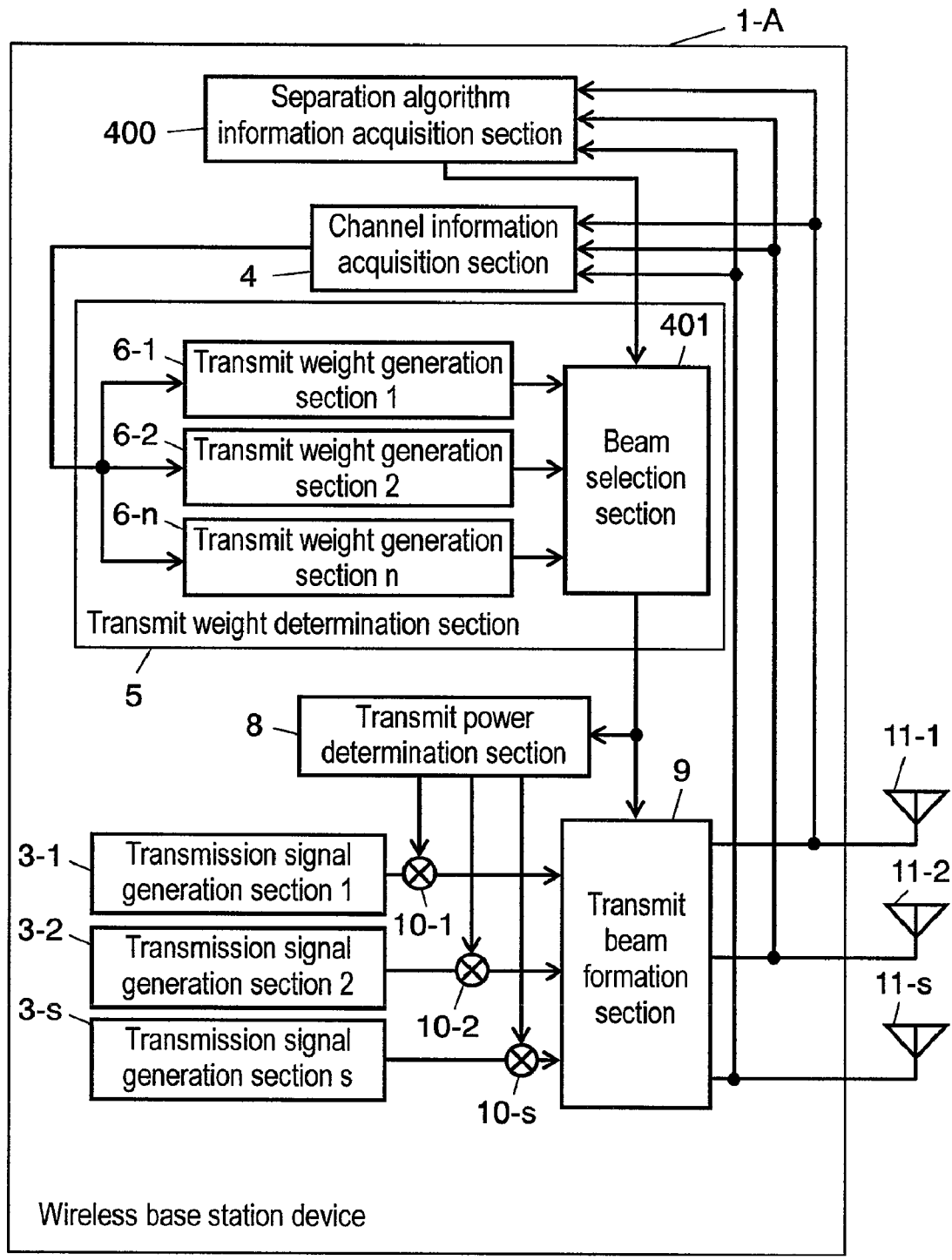
FIG. 12 is a diagram showing a wireless base station device according to a third embodiment of the present invention.
Figure 13:
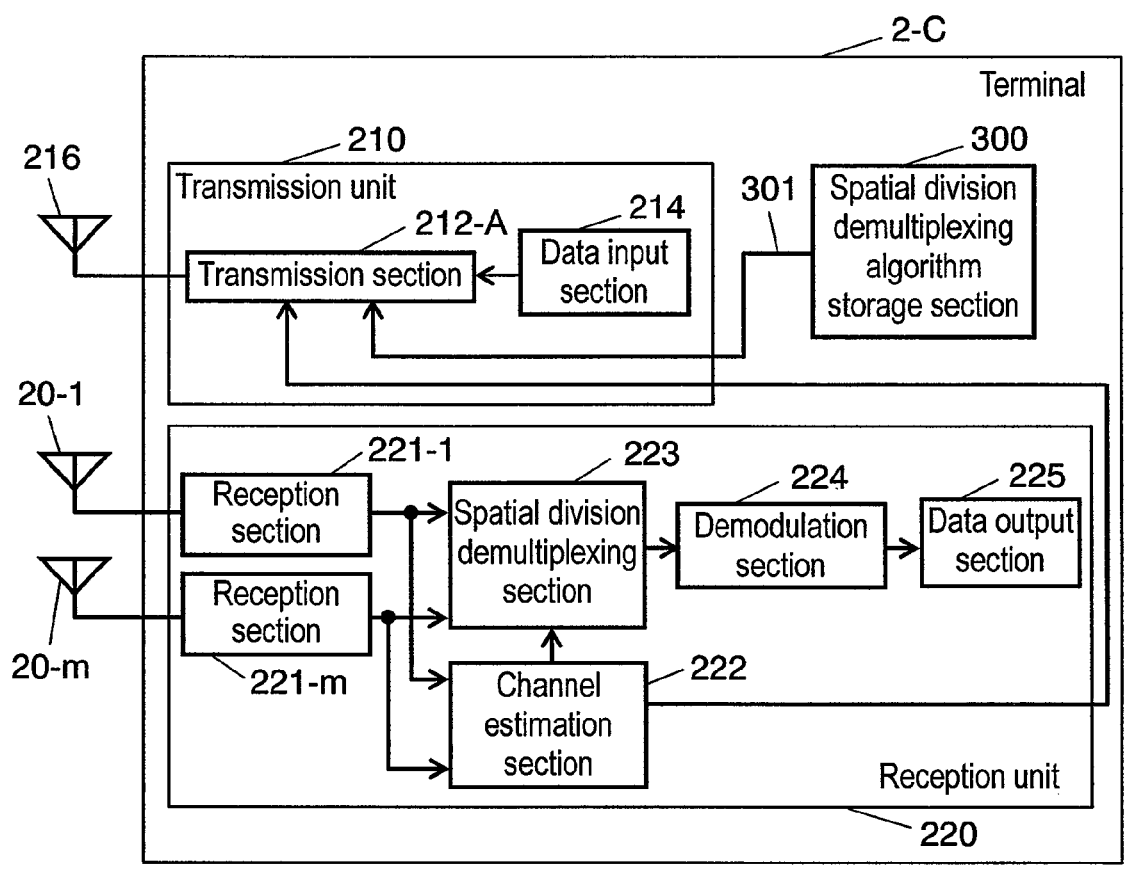
FIG. 13 is a diagram showing a terminal according to the third embodiment of the present invention.

Wireless base station device 1-A and terminal 2-C of a third embodiment of the present invention are shown in FIG. 12 and FIG. 13, respectively. Wireless base station device 1-A of the present embodiment differs from wireless base station device 1 of the first embodiment in that there are provided separation algorithm acquisition section 400 and beam selection section 401. Separation algorithm information acquisition section 400 acquires spatial division demultiplexing algorithm information transmitted from terminal 2-C. Beam selection section 401 selects one of the outputs of transmit weight generation sections 6-1 to 6-$n$ based on the spatial division demultiplexing algorithm information. Terminal 2-C of the present embodiment differs from terminal 2-A of the first embodiment in that terminal 2-C includes spatial division demultiplexing algorithm storage section 300 and transmission section 212-A. Spatial division demultiplexing algorithm storage section 300 stores spatial division demultiplexing algorithm information used in spatial division demultiplexing section 223 which terminal 2-C uses during reception. Transmission section 212-A applies appropriate data processing to spatial division demultiplexing algorithm information 301, which is the output information of spatial division demultiplexing algorithm storage section 300 and converts it into a radio frequency signal. The following description is focused on the operations of the elements added to or modified from those in the first embodiment.

In FIG. 13, terminal 2-C of the present third embodiment having a plurality of antennas includes transmission unit 210 having transmitting unit antenna 216 and reception unit 220 having receiving unit antennas 20-1 to 20-$m$.

Transmission unit 210 includes data input section 214 which receives data information that the terminal user is going to transmit; and transmission section 212-A. Transmission section 212-A applies appropriate data processing to channel estimation information transmitted from channel estimation section 222 and to spatial division demultiplexing algorithm information 301. Spatial division demultiplexing algorithm information 301 is the output information of spatial division demultiplexing algorithm storage section 300 storing the spatial division demultiplexing algorithm information used in spatial division demultiplexing section 223. Transmission section 212-A then converts the information into radio frequency signals. The spatial division demultiplexing algorithm information includes spatial division demultiplexing algorithms such as MMSE, ZF, MLD (Maximum Likelihood Detection), SIC (Successive (or Serial)-Interference-Canceller), and PIC (Parallel-Interference-Canceller). The information can be transmitted using a categorized table to transmit assigned classification numbers so as to reduce the amount of information to be transmitted. Alternatively, a table can be used which ranks the separation algorithms using a performance indicator so as to categorize, for example, MMSE and ZF as class 1; SIC and PIC as class 2; and MLD as class 3.

Reception unit 220 includes reception sections 221-1 to 221-$m$; channel estimation section 222; spatial division demultiplexing section 223; demodulation section 224; and data output section 225. Reception sections 221-1 to 221-$m$, which correspond to receiving unit antennas 20-1 to 20-$m$, respectively, convert radio frequency signals received by receiving antennas 20-1 to 20-$m$ into baseband signals. Channel estimation section 222 estimates channel response information of the propagation paths from baseband signals in the downlink. Spatial division demultiplexing section 223 separates and extracts a desired signal from each of the spatial division multiplexing signals based on the channel response information obtained in channel estimation section 222. Demodulation section 224 restores transmission data sequences from the separately received desired signals. Data output section 225 either outputs the restored reception data sequences to the other apparatus or notifies the information to the terminal user.

Transmitting unit antenna 216 and receiving unit antenna 20-1 to 20-$m$ are treated as different components; however, alternatively, transmitting unit antenna 216 can be integrated with one of receiving unit antennas 20-1 to 20-$m$.

The following is a description of the operations of wireless base station device 1-A and terminal 2-C. Assuming that the channel information of the downlink has been estimated by terminals 2-1 to 2-$s$, the operation to provide this information to wireless base station device 1-A is briefly described.

First, the channel information of a propagation path (unillustrated) estimated by channel estimation section 222 in transmission unit 210 of terminal 2-C is transmitted to transmission section 212-A and then transmitted to wireless base station device 1-A via a control channel or a broadcasting control channel. In other words, a control channel signal or a broadcasting control channel signal carrying the channel information is transmitted to transmitting unit antenna 216 and then emitted therefrom to the propagation path (unillustrated) so as to be transmitted to wireless base station device 1-A.

The control channel or the broadcasting control channel is a communication channel to exchange information of the efficient operation between wireless base station device 1-A and terminal 2-C and is different from a communication channel to exchange information between the user of terminal 2-C and wireless base station device 1-A.

The information that the user of terminal 2-C is going to transmit is transferred from data input section 214 to transmission section 212-A where the information is subjected to appropriate signal processing; converted into a radio frequency signal; and transmitted to wireless base station device 1-A via transmitting unit antenna 216.

Later, in wireless base station device 1-A, channel information acquisition section 4 extracts the channel information contained in the control channel signal or the broadcasting control channel signal transmitted from each of terminals 2-1 to 2-$s$ to wireless base station antennas 11-1 to 11-$s$. Terminals 2-1 to 2-$s$ have the structure of terminal 2-C. Channel information acquisition section 4 then outputs the extracted channel information to transmit weight determination section 5.

The following is a brief description of the operation of spatial division multiplexing transmission by multiplying each of the signals to be transmitted to terminals 2-1 to 2-$s$ by an appropriate transmit weight. Terminals 2-1 to 2-$s$ are to be connected by spatial division multiplexing (allocated) based on the channel information of the downlink and the spatial division demultiplexing algorithm information which have been notified to wireless base station device 1-A.

First, in wireless base station device 1-A, channel information acquisition section 4 extracts the channel information contained in the control channel signal or the broadcasting control channel signal transmitted to wireless base station antennas 11-1 to 11-$s$ from each of terminals 2-1 to 2-$s$ to be connected by spatial division multiplexing (allocated). Channel information acquisition section 4 then outputs the extracted channel information to transmit weight determination section 5. The channel information thus extracted is the channel information of the downlink from wireless base station device 1-A to terminals 2-1 to 2-$s$. Furthermore, separation algorithm information acquisition section 400 extracts the spatial division demultiplexing algorithm information contained in the control channel signal or the broadcasting control channel signal transmitted to wireless base station antennas 11-1 to 11-$s$ from each of terminals 2-1 to 2-$s$ to be connected by spatial division multiplexing (allocated). Separation algorithm information acquisition section 400 then outputs the extracted spatial division demultiplexing algorithm information to transmit weight determination section 5.

Next, in transmit weight determination section 5, transmit weight generation sections 6-1 to 6-$n$, which have different transmit weight generation algorithms, generate pieces of transmit weight generation information. This allows transmitting an optimum signal to terminals 2-1 to 2-$s$ to be connected by spatial division multiplexing in accordance with the correlation conditions between terminals 2-1 to 2-$s$. Then, beam selection section 401 selects the transmit weight information that maximizes a predetermined criterion from among the pieces of transmit weight generation information generated by first to n-th transmit weight generation sections 6-1 to 6-$n$. Beam selection section 401 then outputs the selected information to transmit power determination section 8 and transmit beam formation section 9.

Next, transmit power determination section 8 determines a power distribution factor used to determine the transmit power for each spatial division multiplexing stream, based on the received transmit weight information.

On the other hand, transmission signal generation sections 3-1 to 3-$s$ generate signals to be transmitted to terminals 2-1 to 2-$s$ to be connected by spatial division multiplexing (preferably allocated). The signals to be transmitted to terminals 2-1 to 2-$s$ (hereinafter, "transmission data sequences") are outputted after being subjected to appropriate signal processing.

Power factor multipliers 10-1 to 10-$s$ multiply the signal output of each of transmission signal generation sections 3-1 to 3-$s$ by the corresponding one of the power distribution factors determined by transmit power determination section 8.

Transmit beam formation section 9 generates baseband symbol data by multiplying each of transmission data frame sequence signals by a transmit weight used to form a predetermined (selected) beam, based on the transmit weight information from beam selection section 401. The transmission data frame sequence signals have been obtained by the multiplication between the signal outputs and the power distribution factors. After this, in transmit beam formation section 9, digital data, which are the baseband symbol data, are digital-analog converted by an unillustrated digital-analog converter, filtered by an unillustrated band limiting filter, and converted into carrier frequencies by an unillustrated frequency converter, thereby being outputted as radio frequency signals.

Wireless base station antennas 11-1 to 11-*s* emit the received radio frequency signals to unillustrated propagation paths (space) so as to transmit these signals to terminals 2-1 to 2-*s* to be connected by spatial division multiplexing.

How terminals 2-1 to 2-*s* receive the spatially multiplexed signals transmitted from wireless base station device 1 is omitted because it is identical to that of the first embodiment.

Concerning the aforementioned items [1] to [3], no detailed description is given to [1] Transmit weight generation algorithms implemented in transmit weight generation sections 6-1 to 6-*n* and to [3] How to determine the transmit power distribution factor because it is identical to that of the first embodiment. The following description is focused on [2] How beam selection section 401 selects transmit weight information, which is different from that of the first embodiment.

A Detailed Description on [2] How Beam Selection Section 401 Selects Transmit Weight Information How beam selection section 401 selects transmit weight information is described in detail as follows. Beam selection section 401 selects a transmit weight information that maximizes a predetermined criterion from among pieces of transmit weight information generated by first to n-th transmit weight generation sections 6-1 to 6-*n*. The criterion is determined by calculating a predicted value of physical quantity based on the output of separation algorithm information acquisition section 400. The physical quantity indicates signal quality such as the signal-to-noise power ratio (SNR) or the signal-to-interference and noise power ratio (SINR) received by terminal 2-C. This is the point where beam selection section 401 is different from beam selection section 7 of the first embodiment.

More specifically, in the first embodiment, when terminal 2-*k* has a plurality of antennas, SINR estimation is performed using Equation 17 on the assumption that the directivity is formed using reception weight R(k). In contrast, in the present embodiment, reception weight R(k) is generated using channel information H(k) on k-th terminal 2-*k* based on spatial division demultiplexing algorithm information of terminal 2-*k*, which is the output of separation algorithm information acquisition section 400. Reception weight R(k) represents a column vector having Nr(k) elements the same number as the number of receiving unit antennas of terminal 2-*k*. In Equation 17, the subscript "n" represents the number of user terminals, that is, the total number of terminals 2 to be connected by spatial division multiplexing, which corresponds to terminals 2-1 to 2-*s* in the present embodiment. The spatial division demultiplexing algorithm information can be MMSE algorithm, ZF algorithm, or eigenvector beam reception algorithm when there is an interference component and can be a maximum ratio combining reception weight when there is no need to consider an interference component.

Through the aforementioned calculations, SINRn(k) of each user is calculated using Wn(k) expressed by Equation 17 as a variable. SINRn(k) is calculated for the outputs of all of the first to n-th transmit weight generation sections. Then, beam selection section 401 selects transmit weight Ws(k) where k=1 to Ns. Transmit weight Ws(k) is the output information of s-th transmit weight generation section 6-*s* which generates the transmit weight making the total SINRn(k) of all users largest.

As described hereinbefore, in the third embodiment of the present invention, predicted SINR estimation is performed using the spatial division demultiplexing algorithm information transmitted from a terminal. This allows the predicted SINR evaluated value to approach closer to the SINR actually received by the terminals. Thus, such predicted SINR can be used to select an optimum transmit weight, thereby improving the communication quality of terminals 2 and increasing the communication system capacity.

The predicted SINR is also used to determine a transmit power distribution factor. This allows the predicted SINR evaluated value to approach closer to the SINR actually received by the terminals, thereby performing an optimum power distribution. Such transmit power control ensures that the communications quality of terminal 2 for communication is at a sufficient level, and eliminates the need to increase the transmit power more than necessary. As a result, the present embodiment can be applied to a cellular system to reduce the inter-cell interference and increase the communication system capacity.

Fourth Embodiment

Figure 14:
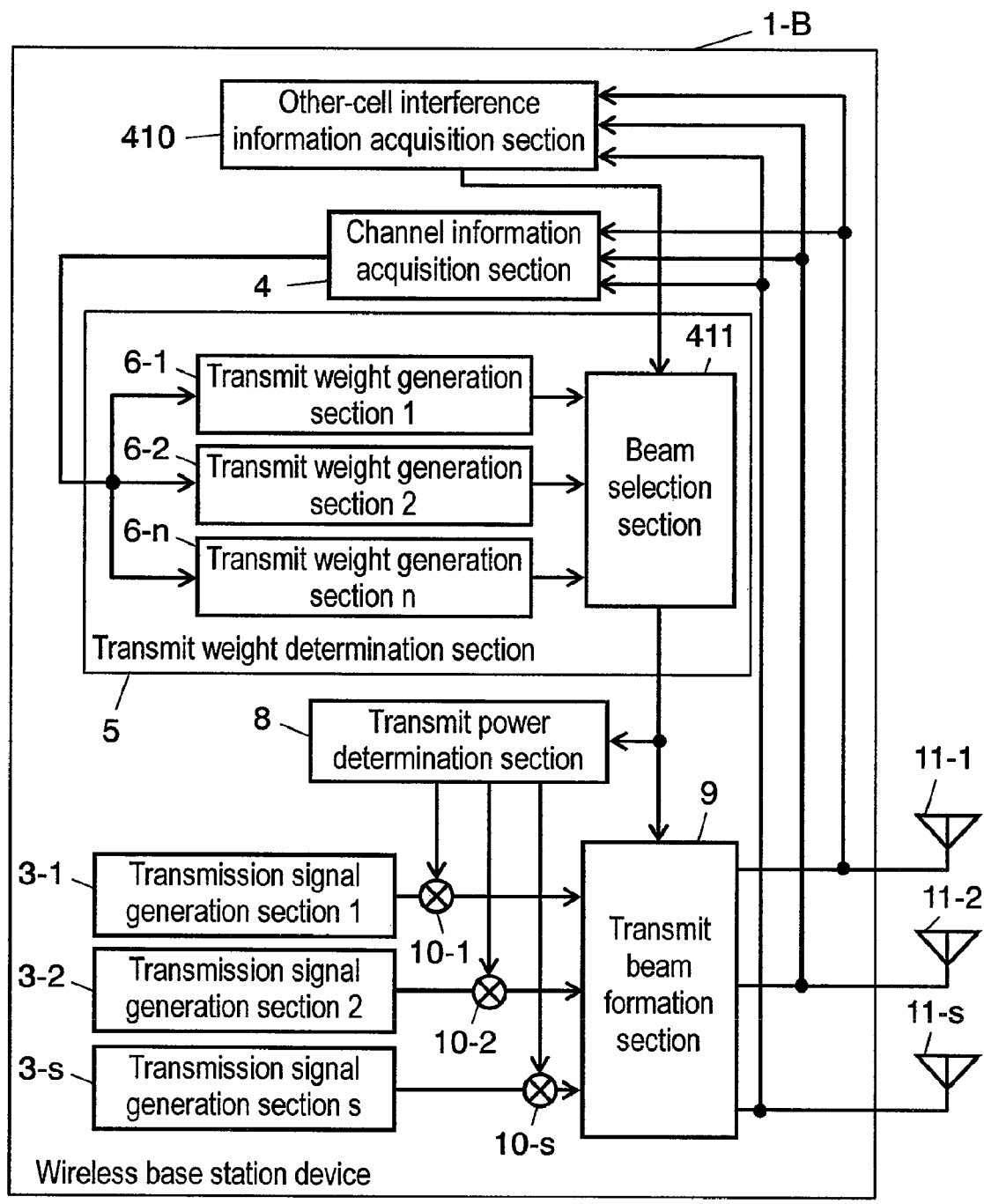
FIG. 14 is a diagram showing a wireless base station device according to a fourth embodiment of the present invention.
Figure 15:
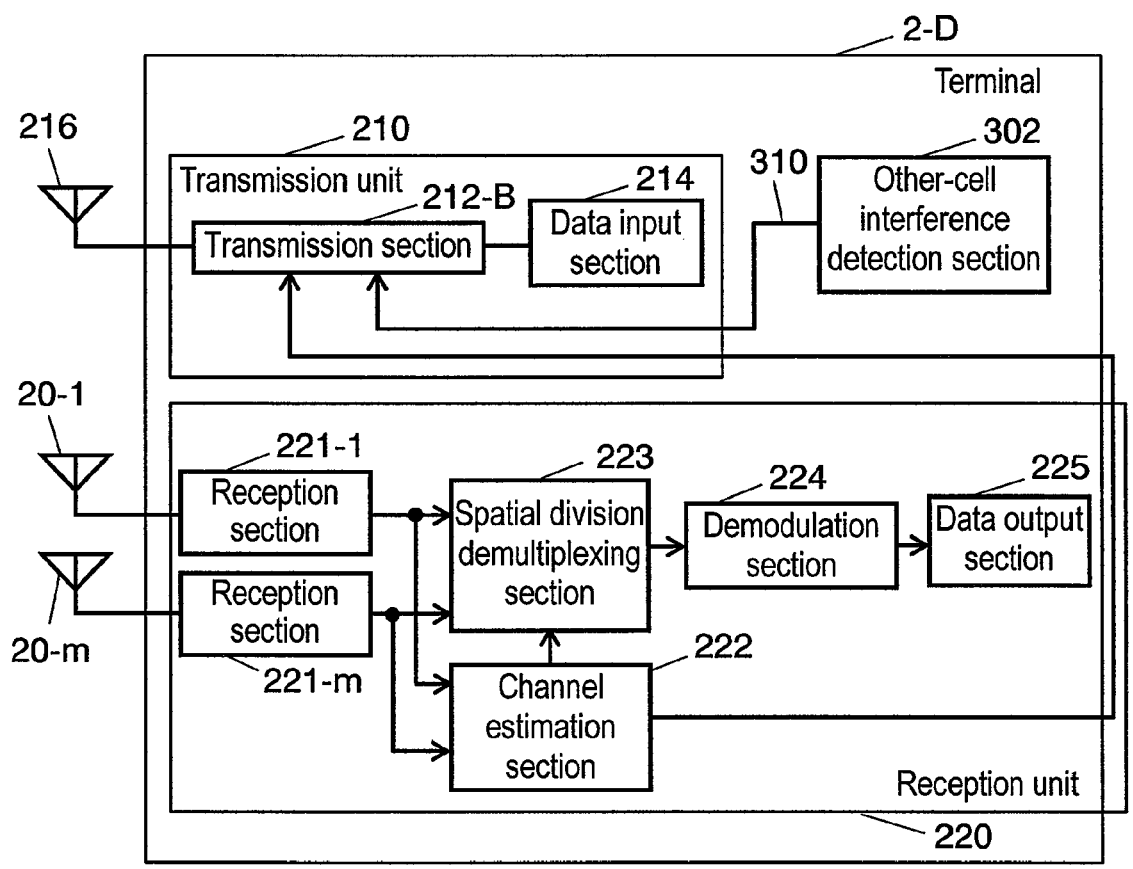
FIG. 15 is a diagram showing a terminal according to the fourth embodiment of the present invention.

Wireless base station device 1-B and terminal 2-D of a fourth embodiment of the present invention are shown in FIG. 14 and FIG. 15, respectively. Wireless base station device 1-B differs from wireless base station device 1 of the first embodiment in that there are provided other-cell interference information acquisition section 410 and beam selection section 411. Other-cell interference information acquisition section 410 acquires other-cell interference information transmitted from terminal 2-D. Beam selection section 411 selects one of the outputs of transmit weight generation sections 6-1 to 6-*n* based on the acquired other-cell interference information.

Terminal 2-D of the present embodiment differs from terminal 2-A of the first embodiment in that there are provided other-cell interference detection section 302 and transmission section 212-B. Other-cell interference detection section 302 measures the conditions of interference that terminal 2-D receives from other cells during reception. Transmission section 212-B provides appropriate data processing to other-cell interference information 310, which is output information thereof, and converts it into radio frequency signal. The following description is focused on the operations of the elements added to or modified from those in the first embodiment.

In FIG. 15, terminal 2-D of the fourth embodiment having a plurality of antennas includes transmission unit 210 having transmitting unit antenna 216 and reception unit 220 having receiving unit antennas 20-1 to 20-*m*.

Transmission unit 210 includes data input section 214 and transmission section 212-B. Data input section 214 receives data information that the terminal user is going to transmit. Transmission section 212-B performs appropriate data processing to channel estimation information transmitted from channel estimation section 222 and other-cell interference information outputted from other-cell interference detection section 302. Transmission section 212-B then converts the information to a radio frequency signal.

Reception unit 220 includes reception sections 221-1 to 221-*m*; channel estimation section 222; spatial division demultiplexing section 223; demodulation section 224; and data output section 225. Reception sections 221-1 to 221-*m* correspond to receiving unit antennas 20-1 to 20-*m*, respectively, and convert the radio frequency signals received by receiving unit antennas 20-1 to 20-*m* into baseband signals. Channel estimation section 222 estimates channel response information of propagation paths of the downlink from the baseband signals. Spatial division demultiplexing section 223 separates and extracts desired signals from spatial division multiplexing signals based on the channel response information obtained by channel estimation section 222. Demodulation section 224 restores the transmission data sequences from the separated desired signals. Data output section 225 either outputs the restored reception data sequences to another apparatus or provides the information to the terminal user.

Note that transmitting unit antenna 216 and receiving unit antennas 20-1 to 20-*m* are treated as different components; however, alternatively, transmitting unit antenna 216 can be integrated with one of receiving unit antennas 20-1 to 20-*m*.

The following is a description of wireless base station device 1-B and terminal 2-D. Assuming that the channel information of the downlink has been estimated by terminals 2-1 to 2-*s*, the operation to provide this information to wireless base station device 1-B is briefly described.

First, the channel information of a propagation path (unillustrated) estimated by channel estimation section 222 in transmission unit 210 of terminal 2-D is transmitted to transmission section 212-B and then transmitted to wireless base station device 1-B via a control channel or a broadcasting control channel. In other words, a control channel signal or a broadcasting control channel signal carrying the channel information is transmitted to transmitting unit antenna 216 and then emitted therefrom to the propagation path (unillustrated) so as to be transmitted to wireless base station device 1-B.

The control channel or the broadcasting control channel is a communication channel to exchange information of the efficient operation between wireless base station device 1-B and terminal 2-D and is different from a communication channel to exchange information between the user of terminal 2D and wireless base station device 1-B.

The information that the user of terminal 2-D is going to transmit is transferred from data input section 214 to transmission section 212-B where the information is subjected to appropriate signal processing; converted into a radio frequency signal; and transmitted to wireless base station device 1-B via transmitting unit antenna 216.

Later, in wireless base station device 1-B, channel information acquisition section 4 extracts the channel information contained in the control channel signal or the broadcasting control channel signal transmitted from each of terminals 2-1 to 2-*s* to wireless base station antennas 11-1 to 11-*s*. Terminals 2-1 to 2-*s* have the structure of terminal 2-D. Channel information acquisition section 4 then outputs the extracted channel information to transmit weight determination section 5.

The following is a brief description of the operation of spatial division multiplexing transmission by multiplying each of the signals to be transmitted to terminals 2-1 to 2-*s* by an appropriate transmit weight. Terminals 2-1 to 2-*s* are to be connected by spatial division multiplexing (allocated) based on the channel information of the downlink which has been notified to wireless base station device 1.

First, in wireless base station device 1-B, channel information acquisition section 4 extracts the channel information contained in the control channel signal or the broadcasting control channel signal transmitted to wireless base station antennas 11-1 to 11-*s* from each of terminals 2-1 to 2-*s* to be connected by spatial division multiplexing (allocated). Channel information acquisition section 4 then outputs the extracted channel information to transmit weight determination section 5. The channel information thus extracted is the channel information of the downlink from wireless base station device 1-B to terminals 2-1 to 2-*s*. Furthermore, other-cell interference information acquisition section 410 extracts the other-cell interference information contained in the control channel signal or the broadcasting control channel signal transmitted to wireless base station antennas 11-1 to 11-*s* from each of terminals 2-1 to 2-*s* to be connected by spatial division multiplexing (allocated). Other-cell interference information acquisition section 410 then outputs the extracted other-cell interference information to transmit weight determination section 5.

Next, in transmit weight determination section 5, transmit weight generation sections 6-1 to 6-*n*, which have different transmit weight generation algorithms, generate different sets of transmit weight generation information. This allows transmitting an optimum signal to terminals 2-1 to 2-*s* to be connected by spatial division multiplexing in accordance with the correlation conditions between terminals 2-1 to 2-*s*.

Then, beam selection section 411 selects the transmit weight information that maximizes a predetermined criterion from among the pieces of transmit weight generation information generated by first to n-th transmit weight generation sections 6-1 to 6-*n*. Beam selection section 411 then outputs the selected information to transmit power determination section 8 and to transmit beam formation section 9.

Next, transmit power determination section 8 determines a power distribution factor used to determine the transmit power for each spatial division multiplexing stream, based on the received transmit weight information.

On the other hand, transmission signal generation sections 3-1 to 3-*s* generate signals to be transmitted to terminals 2-1 to 2-*s* to be connected by spatial division multiplexing (preferably allocated). The signals to be transmitted to terminals 2-1 to 2-*s* (hereinafter, "transmission data sequences") are outputted after being subjected to appropriate signal processing.

Power factor multipliers 10-1 to 10-*s* multiply the signal output of each of transmission signal generation sections 3-1 to 3-*s* by the corresponding one of the power distribution factors determined by transmit power determination section 8. Transmit beam formation section 9 generates baseband symbol data by multiplying each of transmission data frame sequence signals by a transmit weight used to form a predetermined or selected beam, based on the transmit weight information from beam selection section 411. The transmission data frame sequence signals have been obtained by the multiplication between the signal outputs and the power distribution factors. After this, in transmit beam formation section 9, digital data, which are the baseband symbol data, are digital-analog converted by an unillustrated digital-analog converter, filtered by an unillustrated band limiting filter, and converted into carrier frequencies by an unillustrated frequency converter, thereby being outputted as radio frequency signals.

Wireless base station antennas 11-1 to 11-*s* emit the received radio frequency signals to unillustrated propagation paths (space) so as to transmit these signals to terminals 2-1 to 2-*s* to be connected by spatial division multiplexing.

How terminals 2-1 to 2-*s* receive the spatially multiplexed signals transmitted from wireless base station device 1-B is omitted because it is identical to that of the first embodiment.

Concerning the aforementioned items [1] to [3], no detailed description is given to [1] Transmit weight generation algorithms implemented in transmit weight generation sections 6-1 to 6-*n* and to [3] How to determine the transmit power distribution factor because it is identical to that of the first embodiment. The following description is focused on [2]

How beam selection section 411 selects transmit weight information, which is different from that of the first embodiment.

A Detailed Description on [2] How Beam Selection Section 411 Selects Transmit Weight Information How beam selection section 411 selects transmit weight information is described in detail as follows.

Beam selection section 411 selects a transmit weight information that maximizes a predetermined criterion from among pieces of transmit weight information generated by first to n-th transmit weight generation sections 6-1 to 6-n. The criterion is determined by calculating a predicted value of physical quantity based on the output of other-cell interference information acquisition section 410. The physical quantity indicates signal quality such as the signal-to-noise power ratio (SNR) or the signal-to-interference and noise power ratio (SINR) received by terminal 2-D. This is the point where beam selection section 411 is different from beam selection section 7 of the first embodiment.

More specifically, in the first embodiment, when there are pieces of channel information H(k) and terminal 2-k has a plurality of antennas, SINR estimation is performed using Equation 17 on the assumption that the directivity is formed using reception weight R(k). In contrast, in the present embodiment, SINR estimation is performed using Equation 28 including other-cell interference information F(k) of terminal 2-k, which is the output of other-cell interference information acquisition section 410.

$$SINR_n(k) = \frac{|R(k)H(k)W_n(k)|^2}{\sum_{j=1, j \neq k}^{Ns} |R(k)H(k)W_m(j)|^2 + \sigma^2 \|R(k)\|^2 + F(k)}$$ Equation 28

Reception weight R(k) represents a column vector having Nr(k) elements the same number as the number of receiving unit antennas of terminal 2-k. In Equation 28, the subscript "n" represents the number of user terminals, that is, the total number of terminals 2 to be connected by spatial division multiplexing, which corresponds to terminals 2-1 to 2-s in the present embodiment. The spatial division demultiplexing algorithm information can be MMSE algorithm, ZF algorithm, or eigenvector beam reception algorithm when there is an interference component and can be a maximum ratio combining reception weight when there is no need to consider an interference component.

Through the aforementioned calculations, SINRn(k) of each user is calculated using Wn(k) expressed by Equation 28 as a variable. SINRn(k) is calculated for the outputs of all of the first to n-th transmit weight generation sections. Then, beam selection section 411 selects transmit weight Ws(k) where k=1 to Ns. Transmit weight Ws(k) is the output information of s-th transmit weight generation section 6-s which generates the transmit weight making the total SINRn(k) of all users largest.

As described hereinbefore in the fourth embodiment of the present invention, predicted SINR estimation is performed by using the other-cell interference information transmitted from terminal 2-D. This enables a predicted SINR reflecting the conditions of interference caused by other cells to be calculated only by the channel information, thereby allowing the predicted SINR evaluated value to approach closer to the SINR actually received by the terminals. Thus, such a predicted SINR can be used to select a transmit weight, making it possible to select an optimum transmit weight, thereby improving the communication quality of terminals 2 for communication and increasing the communication system capacity.

The predicted SINR is also used to determine a transmit power distribution factor. This allows the predicted SINR evaluated value to approach closer to the SINR actually received by the terminals, thereby performing an optimum power distribution. Such transmit power control ensures that the communication quality of terminals 2 for communication is at a sufficient level, and eliminates the need to increase the transmit power more than necessary. As a result, the present embodiment can be applied to a cellular system to reduce the inter-cell interference and increase the communication system capacity.

Figure 16:
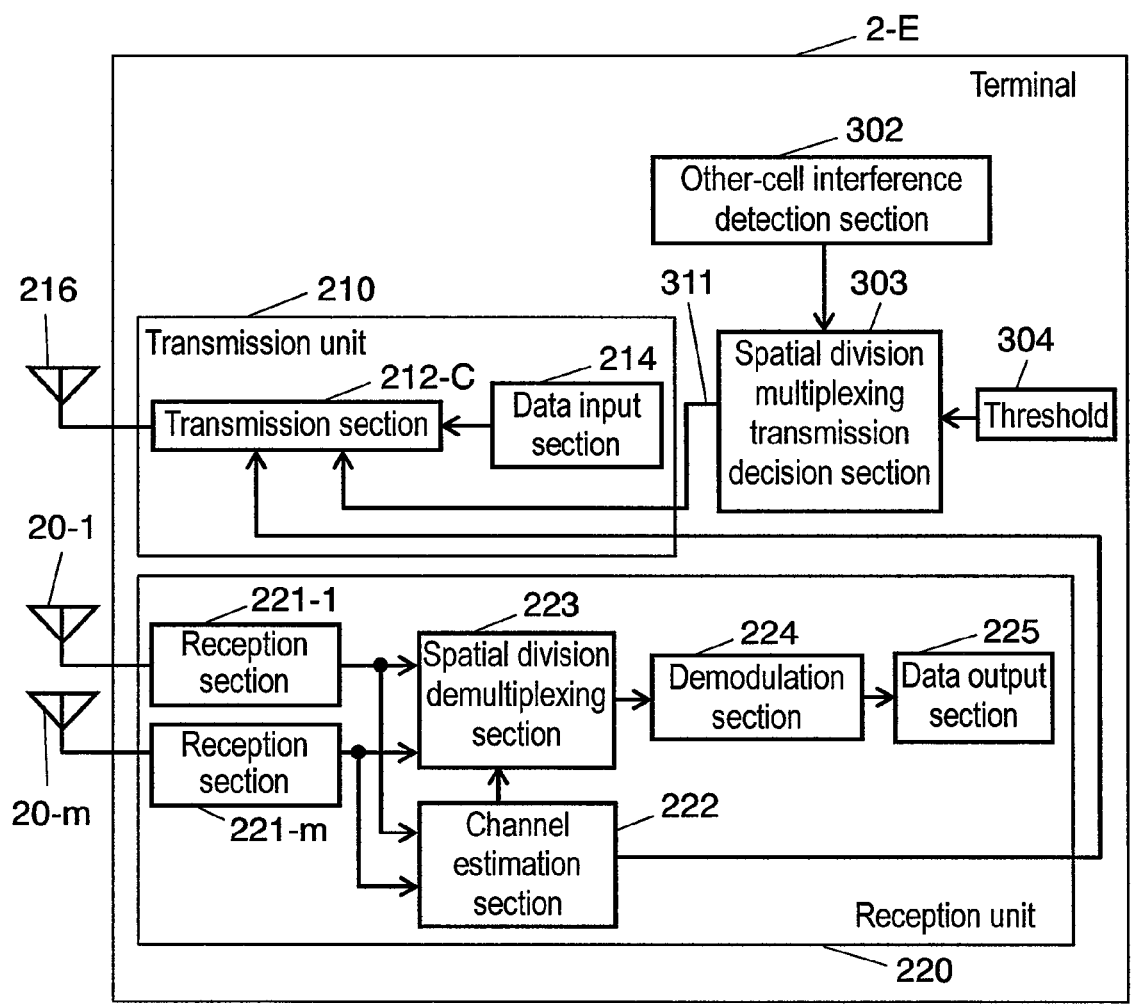
FIG. 16 is a diagram showing another terminal according to the fourth embodiment of the present invention.

Terminal 2-D, which transmits the other-cell interference information to wireless base station device 1-B in the present embodiment, can be replaced by terminal 2-E having another structure as shown in FIG. 16.

Terminal 2-E shown in FIG. 16 differs from terminal 2-D in having spatial division multiplexing transmission decision section 303 between other-cell interference detection section 302 and transmission section 212-C of FIG. 15.

Spatial division multiplexing transmission decision section 303 compares the output value of other-cell interference detection section 302 with predetermined threshold 304. When the other-cell interference is greater than the predetermined threshold, spatial division multiplexing transmission decision section 303 decides that it is impossible to ensure sufficient communication quality to perform spatial division multiplexing transmission. Terminal 2-E then transmits spatial division multiplexing transmission inhibition information as other-cell interference information to wireless base station device 1-B. The spatial division multiplexing transmission inhibition information indicates that spatial division multiplexing transmission is not performed. On the other hand, wireless base station device 1-B acquires the other-cell interference information. When the information contains the spatial division multiplexing transmission inhibition information, wireless base station device 1-B performs communication in a mode not performing spatial division multiplexing transmission.

The aforementioned structure allows terminals 2 to decide whether spatial division multiplexing transmission is possible or not depending on the other-cell interference conditions. More specifically, the threshold to the other-cell interference is set generally depending on the performance of reception system of the terminals, so that wireless base station device 1 cannot achieve a uniform judgment. Therefore, the control of spatial division multiplexing transmission of wireless base station device 1 can be better achieved based on the results judged by terminals 2. This ensures communication quality in an area that cannot ignore interference caused by other cells, particularly by cell edges.

As described hereinbefore, in the present embodiment, it becomes possible to improve and ensure the communication quality under various spatial correlation conditions and hence to increase system capacity by the spatial division multiplexing transmission.

INDUSTRIAL APPLICABILITY

The wireless base station device and the terminal according to the present invention are useful in the field of wireless communication using spatial division multiplexing. This is because the wireless base station device and the terminal have the function of selecting an optimum weight information from among pieces of transmit weight information according to different algorithms depending on the spatial correlation characteristics of the terminals to be connected by spatial division multiplexing. This simplifies the wireless base station device and reduces the processing delay, thereby increasing the system capacity.

The invention claimed is:

1. A terminal comprising:
a channel estimation section configured to receive a plurality of spatially-multiplexed transmitted signals and to perform channel estimation by comparing a known signal sequence with a signal sequence provided in each of the spatially-multiplexed transmitted signals; and
a spatial division demultiplexing section generating a reception weight based on the channel estimation to separate a desired signal from data signals of a spatial division multiplexing signal and to output the desired signal.

2. The terminal of claim 1, wherein
the reception weight generates a maximum ratio combining reception weight based on a value obtained from the channel estimation.

3. The terminal of claim 1, wherein
the reception weight generates a minimum-mean-square-error weight based on the channel estimation.

4. The terminal of claim 1, wherein
the reception weight is a left singular vector corresponding to a maximum singular value obtained by performing a singular value decomposition of a channel matrix.

5. The terminal of claim 1, further comprising:
an other-cell interference detection section detecting a condition of interference caused by other cells; and
a transmission section notifying a detection value detected by the other-cell interference detection section as other-cell interference information to a wireless base station device.

6. The terminal of claim 1, wherein
the channel estimation section performs the channel estimation by comparing a first known signal sequence provided in each of the plurality of spatially-multiplexed transmitted signals with a second known signal sequence generated by the terminal.

7. A terminal comprising:
a channel estimation section performing channel estimation based on a known signal sequence provided for each spatially-multiplexed transmitted signal;
a spatial division demultiplexing section generating a reception weight to separate a desired signal from a spatial division multiplexing signal and to output the desired signal;
a spatial division demultiplexing algorithm storage section storing spatial division demultiplexing algorithm information used to separate the desired signal from the spatial division multiplexing signal; and
a transmission section notifying the spatial division demultiplexing algorithm information to a wireless base station device.

8. A terminal comprising:
a channel estimation section performing channel estimation based on a known signal sequence provided for each spatially-multiplexed transmitted signal;
a spatial division demultiplexing section generating a reception weight to separate a desired signal from a spatial division multiplexing signal and to output the desired signal;
an other-cell interference detection section detecting a condition of interference caused by other cells;
a spatial division multiplexing transmission decision section deciding whether spatial division multiplexing transmission can be performed or not based on a detection value detected by the other-cell interference detection section; and
a transmission section notifying the determination as to whether spatial division multiplexing transmission can be performed or not to a wireless base station device.

9. A terminal comprising:
a channel estimation section performing channel estimation based on a known signal sequence provided for each spatially-multiplexed transmitted signal;
a spatial division demultiplexing section generating a reception weight to separate a desired signal from a spatial division multiplexing signal and to output the desired signal;
an other-cell interference detection section detecting a condition of interference caused by other cells;
a spatial division multiplexing transmission decision section deciding whether spatial division multiplexing transmission can be performed or not based on a detection value detected by the other-cell interference detection section; and
a transmission section notifying the determination as to whether spatial division multiplexing transmission can be performed or not to a wireless base station device;
wherein when the detection value detected by the other-cell interference detection section exceeds a predetermined value, the spatial division multiplexing transmission decision section decides that the spatial division multiplexing transmission has been inhibited and notifies the decision to the wireless base station device.

* * * * *

UNITED STATES PATENT AND TRADEMARK OFFICE
CERTIFICATE OF CORRECTION

| | | |
|---|---|---|
| PATENT NO. | : 8,009,578 B2 | Page 1 of 1 |
| APPLICATION NO. | : 11/911165 | |
| DATED | : August 30, 2011 | |
| INVENTOR(S) | : Takaaki Kishigami et al. | |

It is certified that error appears in the above-identified patent and that said Letters Patent is hereby corrected as shown below:

On the Title Page, FIELD [56], References Cited, FOREIGN PATENT DOCUMENTS, delete duplicate Reference "JP  2003-015775A    2/2003"

Signed and Sealed this
Seventh Day of February, 2012

David J. Kappos
*Director of the United States Patent and Trademark Office*